United States Patent
Matsui

(10) Patent No.: US 8,947,523 B2
(45) Date of Patent: Feb. 3, 2015

(54) IMAGE PROCESSING APPARATUS AND ASSOCIATED METHODOLOGY FOR BLURRING DIGITAL IMAGES

(75) Inventor: Akira Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 403 days.

(21) Appl. No.: 13/091,520

(22) Filed: Apr. 21, 2011

(65) Prior Publication Data

US 2011/0279699 A1 Nov. 17, 2011

(30) Foreign Application Priority Data

May 17, 2010 (JP) ................................. 2010-112929
Mar. 25, 2011 (JP) ................................. 2011-068343

(51) Int. Cl.
| | | |
|---|---|---|
| H04N 5/225 | (2006.01) | |
| H04N 5/262 | (2006.01) | |
| H04N 5/20 | (2006.01) | |
| H04N 5/21 | (2006.01) | |
| H04N 5/77 | (2006.01) | |
| H04N 5/907 | (2006.01) | |
| H04N 9/804 | (2006.01) | |

(52) U.S. Cl.
CPC .............. *H04N 5/2621* (2013.01); *H04N 5/20* (2013.01); *H04N 5/21* (2013.01); *H04N 5/77* (2013.01); *H04N 5/907* (2013.01); *H04N 9/8042* (2013.01)
USPC ......................................... 348/135; 328/106

(58) Field of Classification Search
USPC ................. 382/106; 356/3–22; 348/135–142; 396/80, 89, 104
See application file for complete search history.

(56) References Cited

U.S. PATENT DOCUMENTS

| | | | | |
|---|---|---|---|---|
| 5,576,975 | A * | 11/1996 | Sasaki et al. ................... | 702/158 |
| 7,949,153 | B2 * | 5/2011 | Ono ............................... | 382/106 |
| 8,098,897 | B2 * | 1/2012 | Matsuzawa .................... | 382/106 |
| 8,433,187 | B2 * | 4/2013 | Cohen et al. ................... | 396/125 |
| 2007/0024614 | A1 * | 2/2007 | Tam et al. ....................... | 345/419 |
| 2007/0036427 | A1 * | 2/2007 | Nakamura et al. ............. | 382/154 |
| 2007/0297784 | A1 * | 12/2007 | Wong et al. ..................... | 396/89 |
| 2008/0043217 | A1 * | 2/2008 | Lundgren et al. ............. | 356/4.03 |
| 2008/0112635 | A1 * | 5/2008 | Kondo et al. .................. | 382/255 |
| 2008/0297648 | A1 * | 12/2008 | Furuki et al. .................. | 348/345 |
| 2009/0074393 | A1 * | 3/2009 | Park et al. ...................... | 396/104 |
| 2009/0109304 | A1 * | 4/2009 | Guan ........................ | 348/240.99 |

(Continued)

FOREIGN PATENT DOCUMENTS

JP 2007-66199 3/2007

OTHER PUBLICATIONS

U.S. Appl. No. 13/542,189, filed Jul. 5, 2012, Matsui, et al.

*Primary Examiner* — Twyler Haskins
*Assistant Examiner* — Dwight C Tejano
(74) *Attorney, Agent, or Firm* — Sony Corporation

(57) ABSTRACT

An image processing apparatus includes: an input section receiving input of first image data obtained by shooting a subject in a first optical-system state of an imaging section, and second image data obtained by shooting the subject in a second optical-system state of the imaging section with a blur state different from a blur state of the first image data; and a distance-information calculation section calculating distance information corresponding to a position in a depth direction of the subject on the basis of the first image data and the second image data, wherein the distance-information calculation section corrects a change in the blur by an image height of the optical system to calculate the distance information.

17 Claims, 19 Drawing Sheets

(56) References Cited

U.S. PATENT DOCUMENTS

| | | |
|---|---|---|
| 2010/0045962 A1* | 2/2010 | Keam ................................ 356/3 |
| 2010/0194971 A1* | 8/2010 | Li et al. ......................... 348/349 |
| 2010/0208034 A1* | 8/2010 | Chen .............................. 348/46 |
| 2010/0215219 A1* | 8/2010 | Chang et al. .................. 382/106 |
| 2011/0142287 A1* | 6/2011 | Wong et al. ................... 382/106 |
| 2011/0267507 A1* | 11/2011 | Kane et al. .................... 348/241 |
| 2013/0188019 A1* | 7/2013 | Christopher et al. ........... 348/46 |

\* cited by examiner

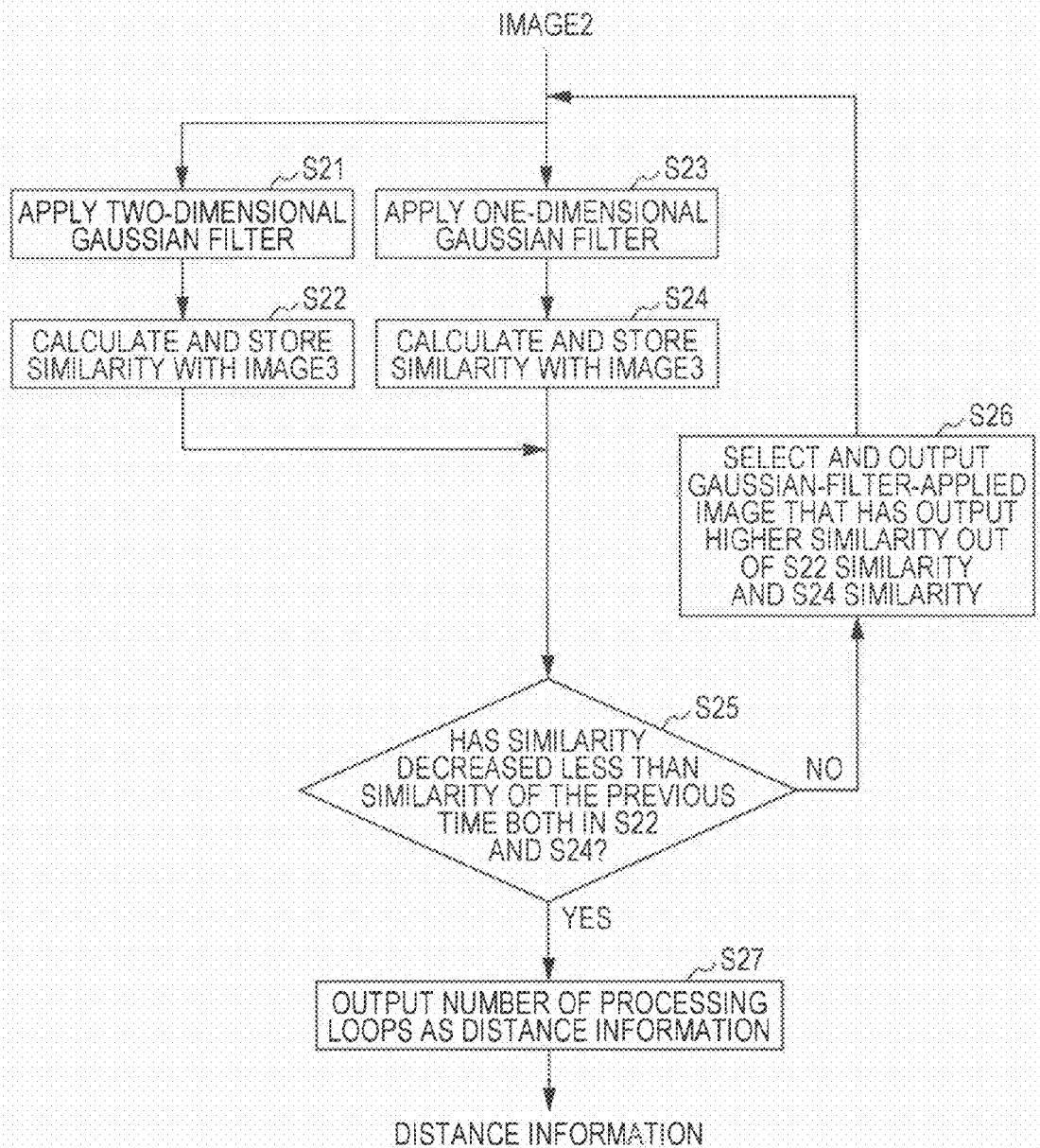

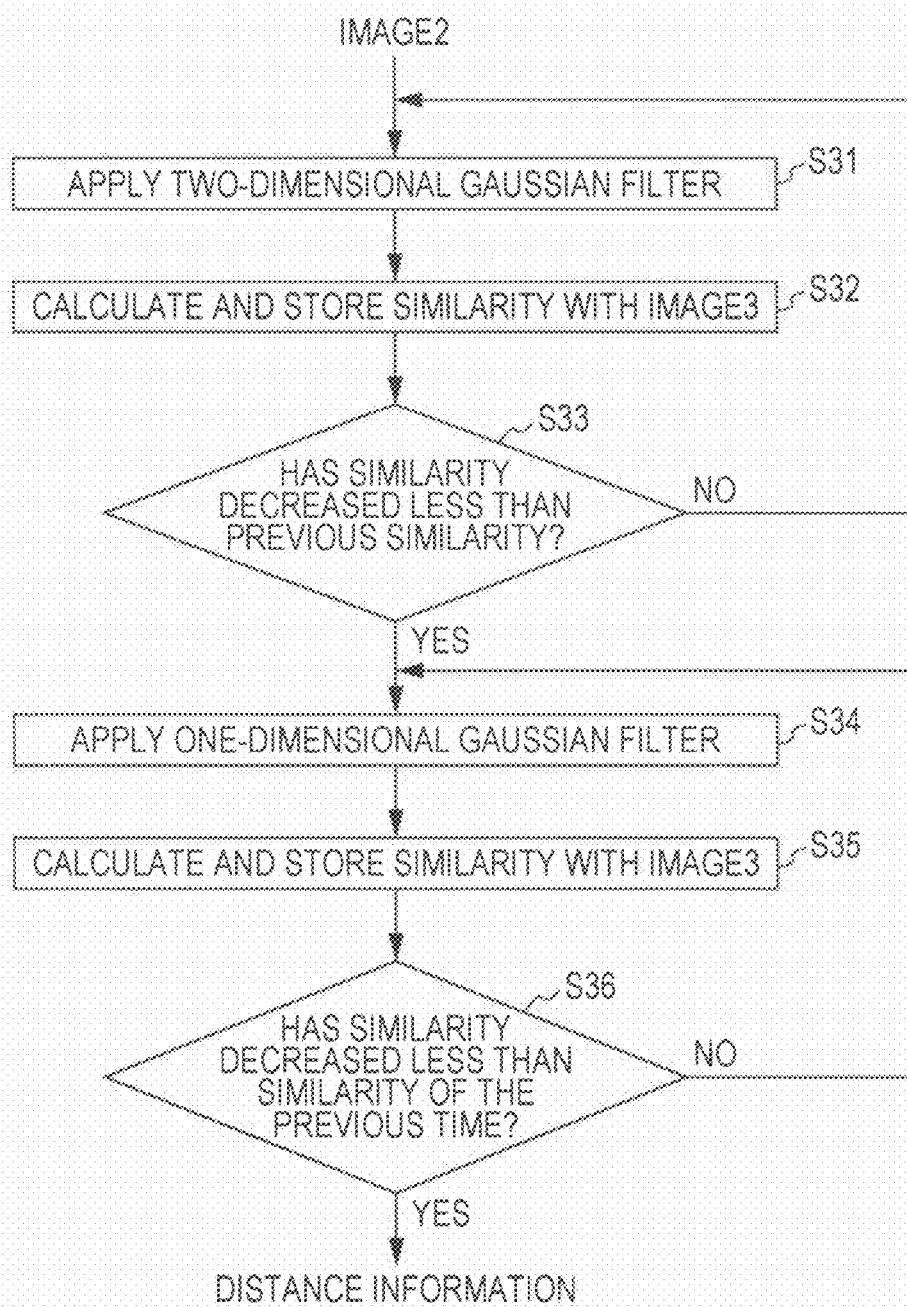

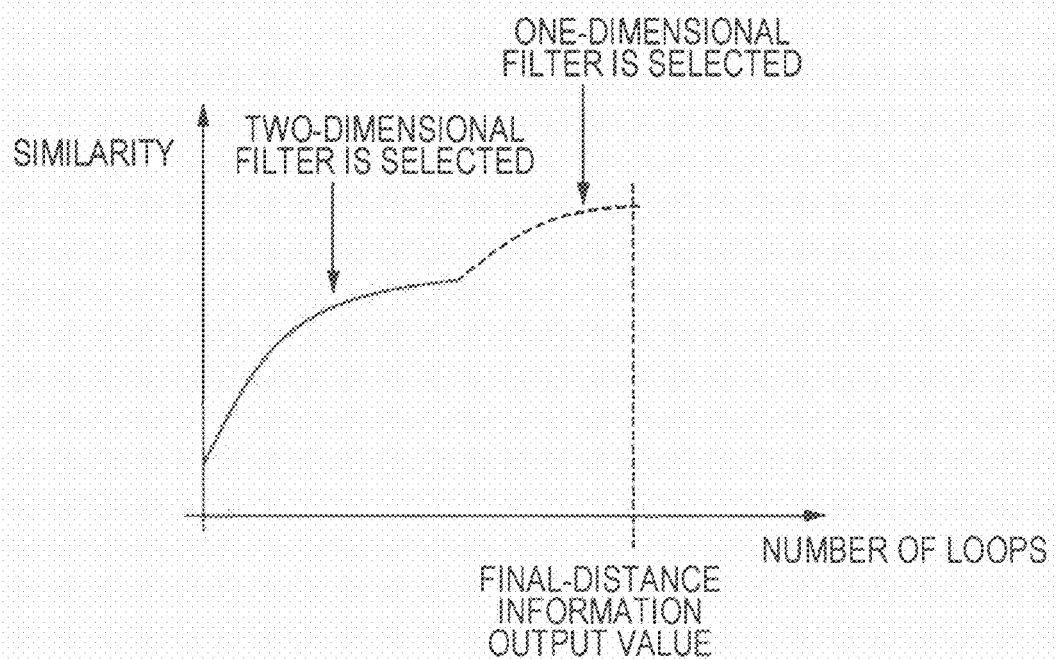

IMAGE PROCESSING APPARATUS AND ASSOCIATED METHODOLOGY FOR BLURRING DIGITAL IMAGES

BACKGROUND

The present disclosure relates to an image processing apparatus, image processing method, and program that is capable of adding a blur in accordance with user's preference to a captured image, for example.

In recent years, for compact-digital still cameras, imaging devices having a small area are often used by demands of miniaturization of the cameras. For example, 1/2.33-type CCDs (6.2×4.6) are used. On the other hand, 35-mm full-sized (36×24) imaging devices, APS-C-size (23.4×16.7) imaging devices, etc., are widespread as large imaging devices.

In such a compact-digital still camera having a small-sized screen, depth of field becomes deep, and a blur effect that can be obtained by related-art film-based cameras and digital single-lens reflex cameras using a large imaging device becomes very little. The blur effect is requested in portrait photography, in which a person is isolated by blurring a background. Under these circumstances, as described in Japanese Unexamined Patent Application Publication No. 2007-66199 in the past, proposals have been made of a method of obtaining a large blur effect even in a digital still camera using a small imaging device.

In a method described in Japanese Unexamined Patent Application Publication No. 2007-66199, in a portrait photograph image, a face and a human body are detected, and the place other than the face and the human body is regarded as a background, and is subjected to blurring processing.

SUMMARY

In the method described in Japanese Unexamined Patent Application Publication No. 2007-66199, blurring processing is uniformly applied to a background. However, different amounts of blur should be originally added to subjects having different distances included in the background. Thus, in the above-described method, there has been a problem in that the method is not effective with respect to addition of a natural blur. Further, in the method described in Japanese Unexamined Patent Application Publication No. 2007-66199, there has been a problem in that it is difficult to apply the method to a subject other than a person.

Further, a proposal has been made of a method in which a plurality of images are captured while changing a state of an optical system, for example, a state of focus, distance information is calculated from the plurality of the captured images, and blurring processing is performed on the basis of the obtained distance information. For example, in order to obtain the distance information, a proposal has been made of a method in which two images are captured with different lens parameters, and distances of subjects are obtained by calculation from diameters of confusion circles estimated from the captured images and lens parameters.

In this method, it is assumed that a blur function in defocus is a two-dimensional isotropic Gaussian distribution. However, in a real lens, a shape of a blur function greatly changes in accordance with an image height, and thus if isotropy is assumed, an error occurs in a distance estimation value in accordance with an image height. As a result, the precision of final blurring processing is inevitably deteriorated. In this regard, the image height is a height from a center of an image. The center of an image usually matches an optical axis of a lens.

It is desirable to provide an image processing apparatus, image processing method, and program that is capable of reducing errors of estimated values based on image height regardless of a change in shape of a blur function depending on image height, and providing an image to which blurring processing is suitably applied for viewing with high precision.

According to an embodiment of the present disclosure, there is provided an image processing apparatus including: an input section receiving input of first image data obtained by shooting a subject in a first optical-system state of an imaging section, and second image data obtained by shooting the subject in a second optical-system state of the imaging section with a blur state different from a blur state of the first image data; and a distance-information calculation section calculating distance information corresponding to a position in a depth direction of the subject on the basis of the first image data and the second image data, wherein the distance-information calculation section corrects a change in the blur by an image height of the optical system to calculate the distance information.

Also, according to another embodiment of the present disclosure, there is provided a method of processing an image of an image processing apparatus, the method including: receiving input of first image data obtained by shooting a subject in a first optical-system state of an imaging section, and second image data obtained by shooting the subject in a second optical-system state of the imaging section with a blur state different from a blur state of the first image data; and calculating distance information corresponding to a position in a depth direction of the subject on the basis of the first image data and the second image data, wherein the distance information is calculated by correcting a change in the blur by an image height of the optical system.

According to another embodiment of the present disclosure, there is provided a program for causing a computer to perform a method of processing an image, the method including: receiving input of first image data obtained by shooting a subject in a first optical-system state of an imaging section, and second image data obtained by shooting the subject in a second optical-system state of the imaging section with a blur state different from a blur state of the first image data; and calculating distance information corresponding to a position in a depth direction of the subject on the basis of the first image data and the second image data, wherein the distance information is calculated by correcting a change in the blur by an image height of the optical system.

In the above-described embodiments, the following are preferable:

The number of blurring processing may be determined on the assumption that the number of blurring processing is zero in the case of processing without adding a blur.

Also, the change in the state of the optical system may be a change in a focus position.

Also, the change in the state of the optical system may be a change in aperture.

Also, the filter may be a two-dimensional Gaussian filter, and a standard deviation of the two-dimensional Gaussian filter may be set to correct a change in the blur by image height.

Also, the number of the blurring processing may be converted into a physical distance.

The distance-information calculation section may calculate the distance information using a filter having a different characteristic depending on the change in the blur by the image height.

The filter may include a first filter and a second filter having a different characteristic from the first filter, and the blurring processing may add the blur selectively using the first filter and the second filter.

By the present disclosure, it is possible to obtain high-precision distance information with smaller errors by reducing distance-information errors based on image height regardless of a change in blur functions depending on image height.

BRIEF DESCRIPTION OF THE DRAWINGS

FIG. 19 is a flowchart illustrating an example of processing in a variation of the first embodiment;

FIG. 20 is a flowchart illustrating another example of processing in a variation of the first embodiment; and FIG. 21 is a schematic diagram illustrating an example of a relationship between a number of processing loops and similarity.

DESCRIPTION OF THE PREFERRED EMBODIMENTS

In the following, descriptions will be given of embodiments of this disclosure. In this regard, the descriptions will be given in the following order.

1. First embodiment
2. Variation of first embodiment
3. Second embodiment
4. Variations In this regard, the embodiments and the variations described below are preferred specific examples of this disclosure, and thus are provided with various limitations that are technically preferable. However, in the following description, the scope of this disclosure is not limited to these embodiments and variations unless otherwise described specifically.

1. First Embodiment

"Imaging Apparatus"

Figure 1:
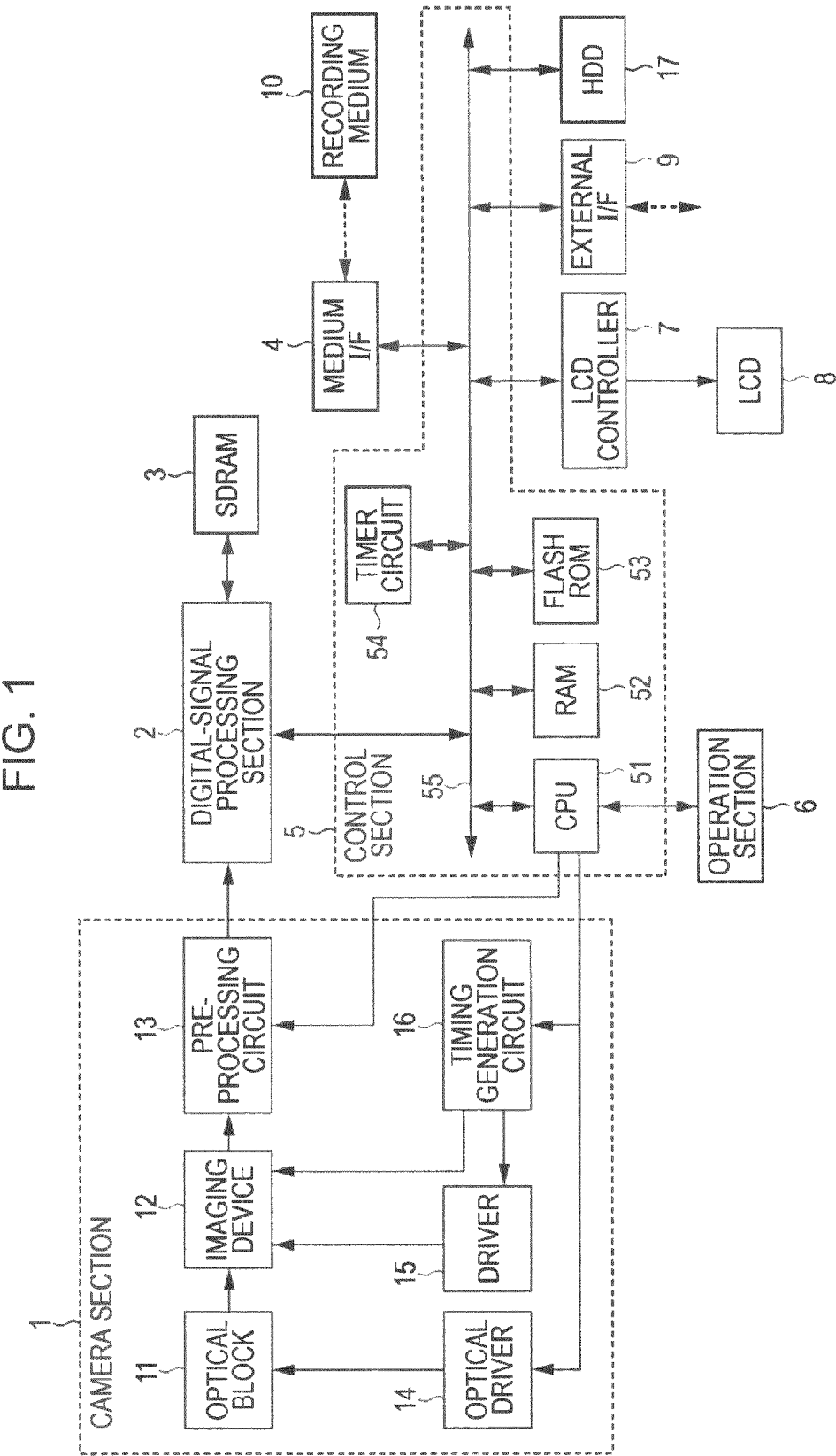
FIG. 1 is a block diagram illustrating an example of a configuration of an imaging apparatus, which is an example of an image processing apparatus according to the present disclosure.

A description will be given of a first embodiment of the present disclosure. Referring to FIG. 1, a description will be given of an example of an imaging apparatus to which the present disclosure can be applied. The imaging apparatus includes a camera section 1, a digital-signal processing section 2, an SDRAM (Synchronous Dynamic Random Access Memory) 3, a medium interface (in the following, referred to as a medium I/F) 4, a control section 5, an operation section 6, and an LCD (Liquid Crystal Display) controller 7, an LCD 8, and an external interface (in the following, referred to as an external I/F) 9. A recording medium 10 can be attached to and detached from the medium I/F 4. Further, the imaging apparatus is provided with a hard disk drive 17, which is a large-volume recording medium, in order to store image files.

The recording medium 10 is a so-called memory card using a semiconductor memory, for example. In addition to the memory card, a hard disk device, an optical recording medium, such as a recordable DVD (Digital Versatile Disc), a recordable CD (Compact Disc), etc., a magnetic disk, etc., can be used.

The camera section 1 includes an optical block 11, an imaging device 12 such as a CCD (Charge Coupled Device), a CMOS (Complementary Metal Oxide Semiconductor), etc., a pre-processing circuit 13, an optical block driver 14, a CCD driver 15, and a timing generation circuit 16. Here, the optical block 11 includes a lens, a focusing mechanism, a shutter mechanism, an aperture (iris) mechanism, etc.

The control section 5 is a microcomputer in which a CPU (Central Processing Unit) 51, a RAM (Random Access Memory) 52, a flash ROM (Read Only Memory) 53, and a timer circuit 54 are connected through a system bus 55. And the control section 5 controls each section of the imaging apparatus according to the first embodiment. The RAM 52 is mainly used as a work area for temporarily storing an intermediate result, etc. The flash ROM 53 stores various programs executed on the CPU 51, and necessary data for processing, etc. The timer circuit 54 has a function of providing a current date, a current day of week, a current time, a shooting date and time, etc., and adding date and time information, such as a shooting date and time, etc., to a captured image file.

At the time of shooting, the optical block driver 14 forms a driving signal for operating the optical block 11 under the control of the control section 5, and supplies the driving signal to the optical block 11 to operate the optical block 11. In the optical block 11, a focusing mechanism, a shutter mechanism, and an aperture mechanism are controlled in accordance with the driving signal from the driver 14, a subject image is captured, and the subject image is supplied to the imaging device 12.

The imaging device 12 performs photoelectric conversion on the subject image from the optical block 11. The imaging device 12 operates in accordance with the driving signal from the imaging device driver 15, captures a subject image, and supplies an electronic signal of the captured subject image to the pre-processing circuit 13 on the basis of the timing signal from the timing generation circuit 16 controlled by the control section 5.

In this regard, the timing generation circuit 16 forms a timing signal to provide a predetermined timing under the control of the control section 5. Also, the imaging device driver 15 forms the driving signal to be supplied to the imaging device 12 on the basis of the timing signal from the timing generation circuit 16.

The pre-processing circuit 13 performs CDS (Correlated Double Sampling) processing on the supplied image signal to improve an S/N ratio, performs AGC (Automatic Gain Control) processing to control a gain, and performs A/D (Analog/Digital) conversion to form image data as a digital signal.

The digital image data from the pre-processing circuit 13 is supplied to the digital-signal processing section 2. The digital-signal processing section 2 performs camera signal processing, such as mosaic processing, AF (Auto Focus), AE (Auto Exposure), and AWB (Auto White Balance), etc., on the image data. The image data having been subjected to the camera signal processing is subjected to data compression by a predetermined compression method, is supplied to the loaded recording medium 10 and/or the hard disk drive 17 through the system bus 55 and the medium I/F 4, and is recorded on the recording medium 10 and/or in the hard disk drive 17 as an image file conforming to a DCF (Design rule for Camera File system) standard, for example.

Also, target image data of the image data recorded on the recording medium 10 is read from the recording medium 10 through the medium I/F 4 in accordance with an input operation received from the user through the operation section 6, and the data is supplied to the digital-signal processing section 2. The operation section 6 includes various kinds of buttons, such as a shutter release button, etc., a lever, a dial, etc. The LCD 8 may include a touch panel, and may allow an input operation by a user pressing on the screen with a finger or a pointing object.

The digital-signal processing section 2 performs decompression processing (expansion processing) on the compressed image data read from the recording medium 10 and supplied through the medium I/F 4, and supplies the image data after the decompression to the LCD controller 7 through the system bus 55. The LCD controller 7 forms a display image signal to be supplied to the LCD 8 from the image data, and supplies the display image signal to the LCD 8. Thereby, an image in accordance with the image data recorded on the recording medium 10 is displayed on the screen of the LCD 8. Further, it is possible to display texts of a menu, etc., graphics on the screen of the LCD 8 under the control of the control section 5 and the LCD controller 7. In this regard, a display form of the image depends on a display processing program recorded in the ROM.

Also, the imaging apparatus is provided with the external I/F 9. For example, an external personal computer is connected to the imaging apparatus through the external I/F 9, and the imaging apparatus is allowed to receive image data from the personal computer, and to record the image data onto a recording medium that is loaded to the imaging apparatus. Also, the imaging apparatus is allowed to supply the image data recorded on the recording medium that is loaded to the imaging apparatus to the external personal computer.

Also, a communication module is connected to the external I/F 9 so that the imaging apparatus can be connected to a network, such as the Internet etc., for example, and the imaging apparatus is allowed to obtain various kinds of image data and other information through the network in order to record the image data onto a recording medium that is loaded to the imaging apparatus. Alternatively, the imaging apparatus is allowed to transmit the data recorded on the recording medium that is loaded to the imaging apparatus to a target destination through the network.

Also, the imaging apparatus is allowed to read and reproduce information, such as image data, which has been obtained through the external personal computer and the network, and recorded on the recording medium, and to display the information to the LCD 8.

In this regard, the external I/F 9 can be provided as a wired interface, such as IEEE (Institute of Electrical and Electronics Engineers) 1394, a USB (Universal Serial Bus), etc., or a wireless interface by light or radio wave. That is to say, the external I/F 9 may be either a wired interface or a wireless interface. It is possible to connect to, for example an external computer not shown in the figure through the external I/F 9, to receive the image data supplied from the computer, and to record the image data on the recording medium 10 and/or into the hard disk drive 17. It is also possible to supply image data recorded on the recording medium 10 and/or in the hard disk drive 17 to the external computer, etc.

By the above-described imaging apparatus, it is possible to shoot a subject image (a still image and a moving image), and record the image on loaded recording medium 10 and/or into the hard disk drive 17. Further, it is possible to read the image data recorded on the recording medium 10 and/or in the hard disk drive 17, display the image, and freely view and edit the image. An index file for managing image data is recorded in a specific area of the recording medium 10 and/or the hard disk drive 17.

Here, a schematic description will be given of operation of the above-described imaging apparatus. The imaging device 12 receives light, and a signal produced by photoelectric conversion is supplied to the pre-processing circuit 13. Then the signal is subjected to DS processing and AGC processing, is converted into a digital signal, and is supplied to the digital-signal processing section 2. In the digital-signal processing section 2, the image data is subjected to image-quality correction processing, and is supplied to the control section 5 as image data of the camera through-the-lens image. The image data input from the control section 5 is supplied to the LCD controller 7, and the camera through-the-lens image is displayed on the LCD 8. It becomes possible to adjust a field angle while viewing the camera through-the-lens image displayed on the LCD 8.

And when the shutter release button of the operation section 6 is pressed, the CPU 51 outputs a control signal to the camera section 1 to perform a shutter operation of the optical block 11. At the same time, the digital-signal processing section 2 performs processing on one-frame image data (recorded image data) supplied from the pre-processing circuit 13, and stores the image data into the SDRAM 3. Further, the recorded image data is subjected to compression coding by the digital-signal processing section 2, the coded data is stored into the hard disk 17, and is also stored into the recording medium 10 through the system bus 55 and the medium interface 4.

In this regard, for a still image data, the CPU 51 obtains a date and time at the time of shooting from the timer circuit 54, and stores the data with that date and time into the hard disk 17 and on the recording medium 10. Further, for a still image, contracted image data of the still image is further generated, and the contracted image data is stored into the hard disk 17 and the recording medium 10 in association with the original still image.

On the other hand, when recorded image data in the hard disk 17 and on the recording medium 10 is reproduced, the recorded image data is read into the SDRAM 3 by the CPU 51 in response to an operation having been input from the operation section 6. And the image data is decoded by the digital-signal processing section 2. The decoded image data is supplied to the LCD 8 through the LCD controller 7, and the reproduced image is to be displayed on the LCD 8.

"Configuration for Blurring Processing"

Figure 2:
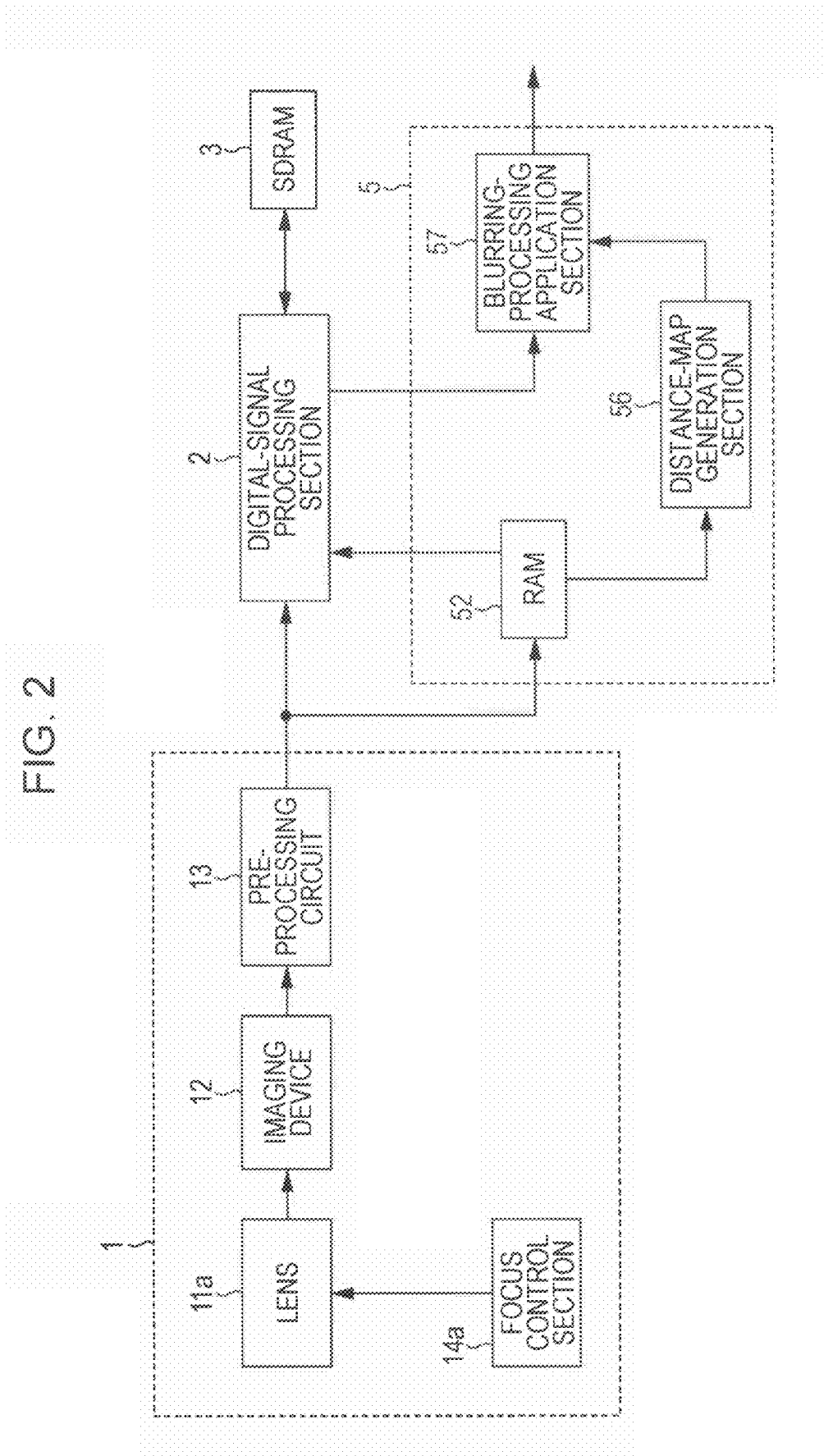
FIG. 2 is a block diagram of the first embodiment of the present disclosure.

In the above-described first embodiment according to the present disclosure, the CPU 51 of the control section 5 performs blurring processing. A configuration related to the blurring processing is shown in FIG. 2. A focus control section 14a controls a lens 11a in the optical block 11 to control focussing. The focus control section 14a includes the CPU 51 and the optical driver 14. Under the control of the focus control section 14a, a plurality of captured images having different focuses with each other are obtained.

First, one image (referred to as a first image) including a subject, for example a person at a foreground, in focus is obtained. Next, the same subject is shot with a focus shifted to a far side by a predetermined distance with respect to the first image to obtain one image (referred to as a second image). Further, one image (referred to as a third image) is obtained with a focus shifted to a near side by the same predetermined distance with respect to the first image. Three images are temporarily stored in the RAM 52, which serves as a data storage section.

The three images have different degrees of blur one another. In the first image, the foreground is in focus, and thus degrees of focus shift of the foregrounds in the second image and the third image become equal. Compared with a blur of the background in the second image, a degree of a blur of the background in the third image becomes large.

A distance-map generation section 56 generates distance information using two images out of the above three images. The distance information is a distance of a subject in accordance with a position in a depth direction of an image, for example, a distance between a foreground and a background. A distance map is information on distances of all the individual pixels in an image, for example.

The first image is subjected to signal processing, such as white balance, mosaic, edge enhancement, etc., by the digital-signal processing section 2. The output signal of the digital-signal processing section 2 is subjected to blurring processing by a blurring-processing application section 57 in accordance with distance-information output from the distance-map generation section 56. The blurring processing is performed only on subjects other than those in a foreground.

The blurring-processing application section 57 outputs a final image for viewing. The image for viewing is recorded on the recording medium 10 and/or in the hard disk drive 17. The distance generation section 56 and the blurring-processing application section 57 means processing of functions performed by programs designed in advance in the CPU 51 of the control section 5. In this regard, images having different focuses may be supplied from an external apparatus through the external I/F 9.

"General Flow of Blurring Processing"

Next, with reference to FIG. 3, a description will be given of operation of the focus control section 14a, the distance-map generation section 56, and the blurring-processing application section 57. In first step S1, a first image is shot. For example, if it is a portrait, shooting is carried out such that a person at the foreground is in focus. The first image is stored in the RAM 52. Next, in step S2, the focus position is changed to a far side by a predetermined amount with respect to the first image. And in step S3, a second image is shot.

Next, in step S4, the focus position is changed to a near side by the predetermined amount with respect to the first image. The amount of change in the focus position is assumed to be equal to the case of obtaining the second image. And in step S5, a third image is shot. Next, in step S6, information on the distances of subjects corresponding to individual pixels held for each of the pixels, namely a so-called distance map, is generated from the second image and the third image. Finally in step S7, the first image is subjected to the blurring processing with reference to the distance map.

For blurring processing, it is possible to use a low-pass filter. In accordance with a distance, whether a low-pass filter is applied or not is changed. Also, an intensity (the lower the cut-off frequency, the higher the intensity) of the filter is changed depending on the distance. That is to say, for example, a low-pass filter is not applied to a foreground (person), and a low-pass filter having intensity in accordance with the distance from the foreground is applied to the background. By the blurring processing, it is possible to generate a portrait image with a blurred background that is preferable for viewing.

"Generation of Distance Map"

Figure 4:
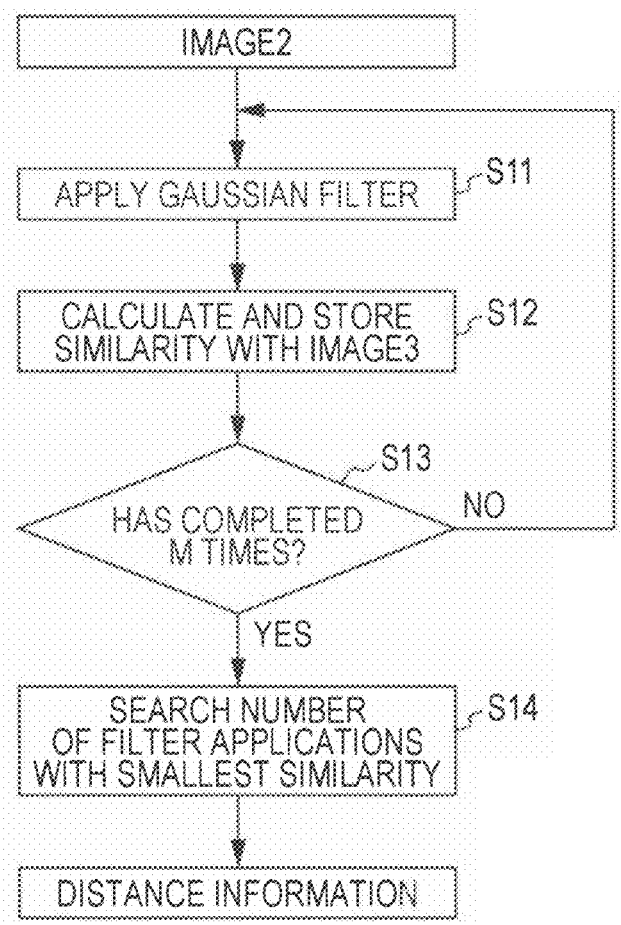
FIG. 4 is a flowchart illustrating a processing flow, for obtaining distance information, according to the first embodiment of the present disclosure.
Figure 5:
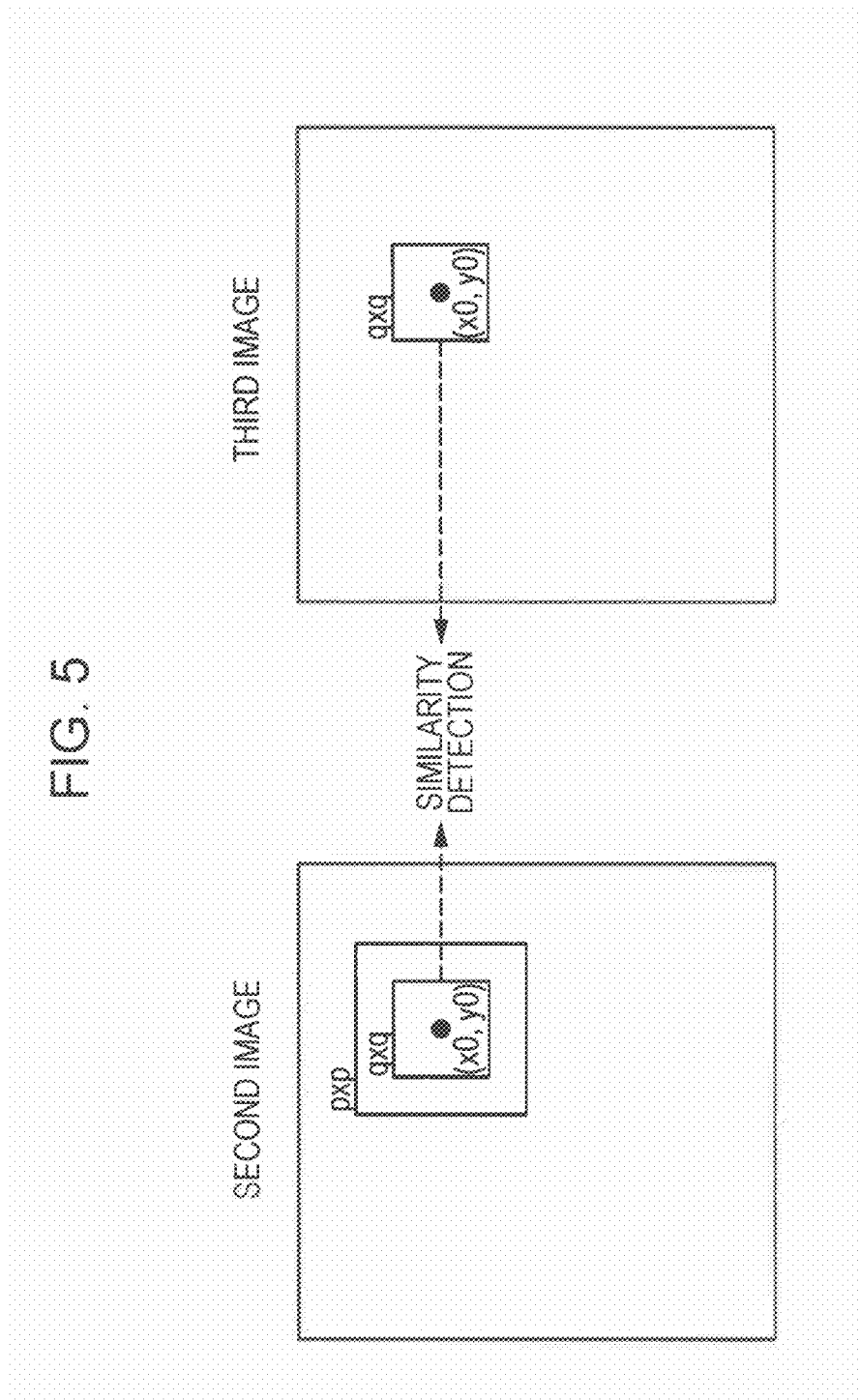
FIG. 5 is a schematic diagram for explaining processing, for obtaining distance information, according to the first embodiment of the present disclosure.

A more detailed description will be given of step S6 (generation of a distance map) with reference to FIG. 4 and FIG. 5. FIG. 5 illustrates a second image and a third image. First, as shown in FIG. 5, any pixel in the second image is selected, and the coordinates thereof is assumed to be (x0, y0). Define a range of (p×p) by p, which is a sufficiently large value with respect to a value of q described later, with (x0, y0) as center. Perform convolution operation on pixel values included in the range of (p×p) of the second image using a predetermined Gaussian filter (step S11 in FIG. 4). The Gaussian filter is a filter for blurring using a Gaussian function. That is to say, in a Gaussian filter, a weight at the time of combining pixels is determines by a Gaussian function in accordance with a distance from a center pixel.

Next, in step S12, similarities are calculated between pixel values of the range of (q×q) with the pixel value (x0, y0) as center from the result of step S11 and pixel values of a range of (q×q) with the pixel value (x0, y0) of the third image as center. For the similarity, a SAD (Sum of Absolute Difference), etc., can be used. For example, absolute values of the differences are obtained between the two pixel values corresponding to same positions in the range (q×q) of the second image and in the range (q×q) of the third image, and the absolute values are integrated for the pixels of (q×q) to be a value of SAD. The greater the similarity, the smaller the value of SAD becomes.

In determination processing (step S13) after step S12, a determination is made of whether the processing of the calculation of the similarities and the storage of the similarity values have been performed M times or not. M is a sufficiently high value. If determined that the processing of the calculation of the similarities and the storage of the similarity values have been performed M times, the processing proceeds to step S14. In step S14, a maximum value of the similarities (a minimum value in the case of using SAD as similarity) is searched among the stored similarity values for M times. The number k of repetitions of step S11 and step S12, which corresponds to a maximum value of the similarities, is determined to be distance information. In this regard, in the case of calculating the similarities, a comparison is made at a stage of not having performed blurring processing by a Gaussian filter.

In foreground areas in the second image and the third image, substantially same blurs are added, and thus SAD becomes small, which is determined that the similarity is great. In background areas, a blur of the background in the third image is greater than a blur of the background in the second image, and thus blur-addition processing is performed on the second image so that the similarity becomes high.

In this regard, for a method of obtaining a maximum value of the similarities, it is possible not to repeat predetermined processing for M times. For example, in the case of using SAD, a local minimum value of SAD may be detected, and a number k of times until the local minimum value of SAD arises may be determined to be distance information. Further, for the similarity, in place of the absolute value of the difference, the square of the difference may be used. Further, the similarity may be detected using a parameter other than SAD.

As described above, k is individually obtained for all the pixels in an image. The distance map includes the obtained k value for each pixel. In this case, in order to reduce the amount of calculation, a distance map may be created in which a value k is obtained not for all the pixels, but is obtained for each pixel sampled at predetermined intervals in the horizontal and/or the vertical directions.

Next, a description will be given of why a value k indicates distance information. First, the following notation is defined.

Img: an image in focus and to which a blur function by defocus has not been applied $\sigma_2$, $\sigma_3$: standard deviations of blur functions (two-dimensional isotropic Gaussian functions) applied to the second image and the third image, respectively $\sigma_f$: standard deviation of a Gaussian filter applied in step S11

Figure 6:
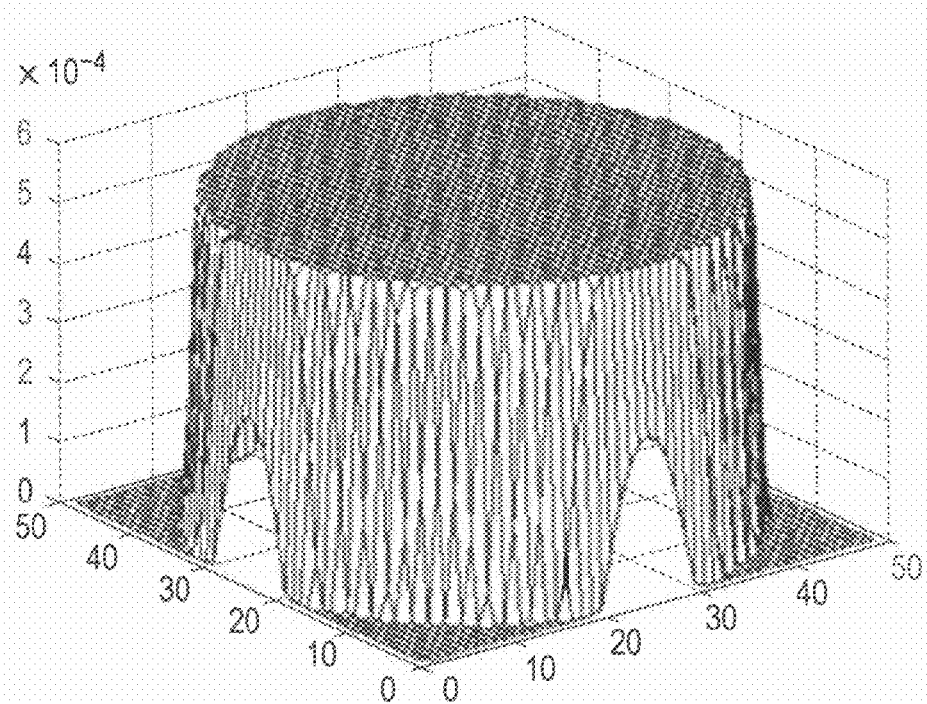
FIG. 6 is a schematic diagram used for explaining a Pill Box function.

A blur function in defocus is obtained as a Pill Box function having a diameter of a circle of confusion as shown in FIG. 6 in geometrical optics. When a point image is in focus, the point image is generated on an imaging surface. However, if the point image is out of focus, a circle image is generated by a blur. This circle is called a circle of confusion.

Figure 7:
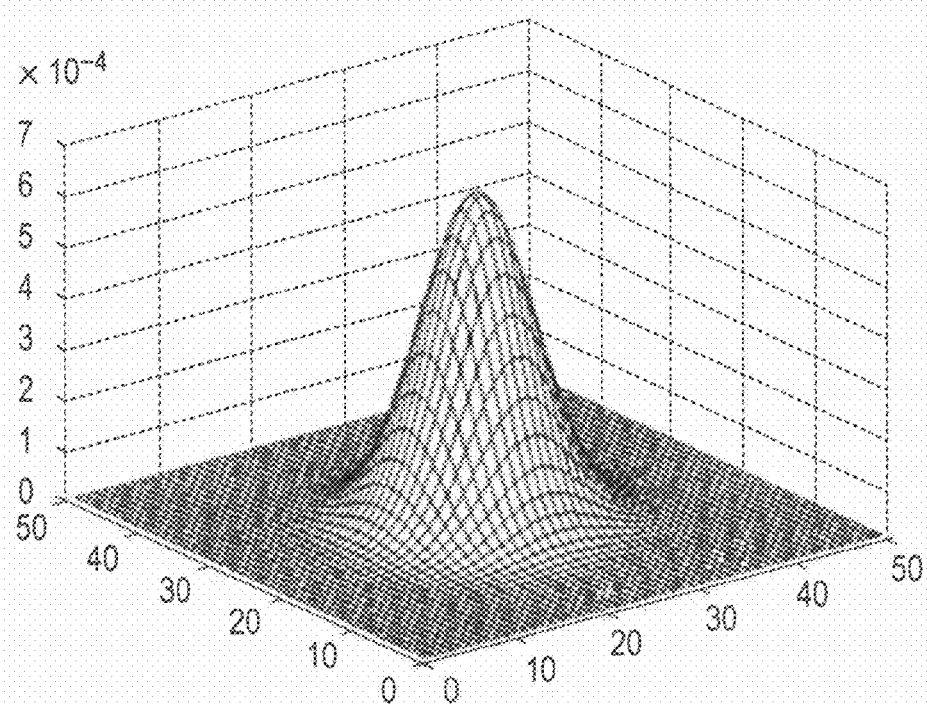
FIG. 7 is a schematic diagram used for explaining a Gaussian filter.

However, in a real lens, the function is often approximated to a two-dimensional isotropic Gaussian function as shown in FIG. 7 in consideration of the influence of aberration. In FIG. 7, the position of the center is a position of pixel to be processed (a pixel of interest). A Gaussian filter has a distribution (a function of a Gaussian distribution) in which the nearer to the position of a pixel of interest, the heavier a weight for calculating an average value of a pixel is given, and the farther from the position of a pixel of interest, the lighter a weight is given. The smaller the standard deviation and the narrower the width of distribution, the smaller the effect of smoothing becomes.

It is assumed that, in the first embodiment of the present disclosure, blur functions in defocus of the second image and the third image are approximated to a two-dimensional isotropic Gaussian function, and the standard deviations thereof are $\sigma_2$ and $\sigma_3$. At this time, the process of obtaining k in the processing shown in FIG. 4 corresponds to obtaining k in the following expression 1 (G ($\mu$, $\sigma$) is a two-dimensional isotropic Gaussian function of a mean $\mu$ and a standard deviation $\sigma$). Further, the variance is a square expected value of the differences from the average.

$$Img \otimes G(0, \sigma_3) = \\ Img \otimes G(0, \sigma_2) \otimes \underbrace{G(0, \sigma_f) \otimes G(0, \sigma_f) \ldots \otimes G(0, \sigma_f)}_{k} \quad (1)$$

Here, in general, a convolution of Gaussian functions becomes a Gaussian function, and the sum ($\sigma_2^2+\sigma_3^2$) of variances of two Gaussian functions to be subjected to the convolution matches the variance of the Gaussian function of the convolution result. By using this fact, k can be described by the following Expression 2.

$$k = \frac{\sigma_3^2 - \sigma_2^2}{\sigma_f^2} = \frac{(\sigma_3 - \sigma_2)(\sigma_3 + \sigma_2)}{\sigma_f^2} \quad (2)$$

From Expression 2, k has relationships as described below.

1. The number k is inversely proportional to a square of $\sigma_f$. If $\sigma_f$ is a constant value, the denominator of Expression 2 becomes a constant value.

2. The number k is proportional to ($\sigma_3-\sigma_2$). The value ($\sigma_3-\sigma_2$) can be approximately interpreted as the difference of the diameters of circles of confusion in the blur function in defocus of the second image and the third image. This value becomes a constant value if the amount of defocus in the second image and the third image with respect to the first image kept constant. That is to say, for example, if the second image is defocused to a far side by 2 DoF (Depth of Field) with respect to the first image, and the third image is defocused to a near side by 2 DoF with respect to the first image, ($\sigma_3-\sigma_2$) becomes a constant value that is four times an allowable circle of confusion.

3. The number k is proportional to ($\sigma_3+\sigma_2$). The value ($\sigma_3+\sigma_2$) can be approximately interpreted as the sum of the diameters of the blur functions in the defocus of the second image and the third image or two times the average value thereof.

For example, as described above, the second image is defocused to a far side by 2 DoF with respect to the first image, and the third image is defocused to a near side by 2 DoF with respect to the first image. Also, assuming that a relative distance between the foreground position and the background position that are focused at the time of capturing the first image is n DoF, $\sigma_2$ becomes (n−2) times the allowable circle of confusion, and $\sigma_3$ becomes (n+2) times the allowable circle of confusion. The value ($\sigma_3+\sigma_2$) becomes 2n times the allowable circle of confusion. Accordingly, ($\sigma_3+\sigma_2$) is proportional to a relative distance n between the foreground position and the background position.

Figure 8:
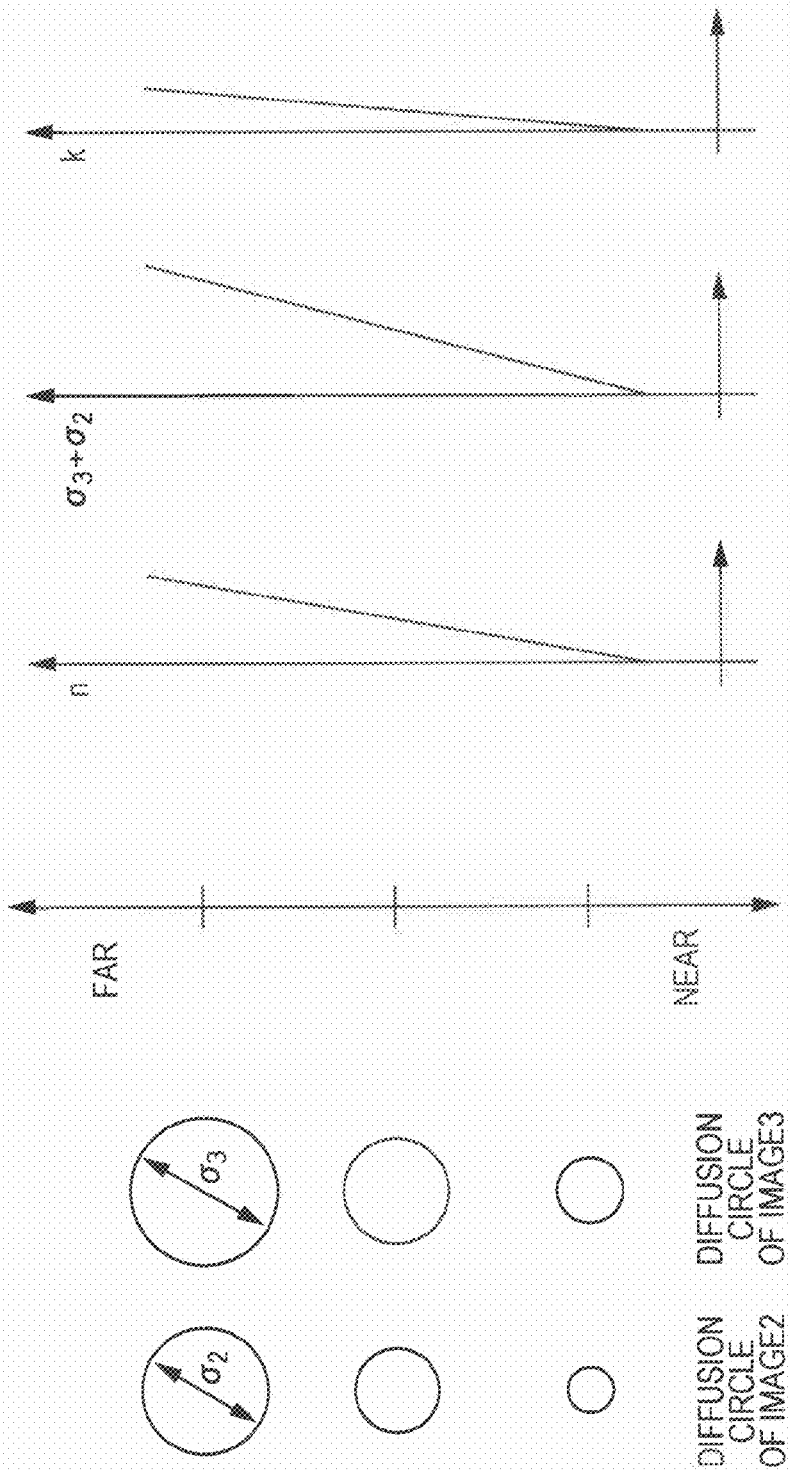
FIG. 8 is a schematic diagram, used for explaining a method of obtaining distance information, according to the first embodiment of the present disclosure.

From the above-described relationships, after all, k has a quality of being proportional to a relative distance n of the foreground position and the background position. On the basis of this quality, it is possible to obtain distance information that is proportional to a relative distance between the foreground and the background by calculating k. The relationships among k, n, ($\sigma_3+\sigma_2$) are shown in FIG. 8. That is to say, FIG. 8 schematically illustrates that there is a relationship k$\propto\sigma_3+\sigma_2\propto$n ($\propto$ represents a $\propto$ relationship).

"Blurring Processing"

Figure 3:
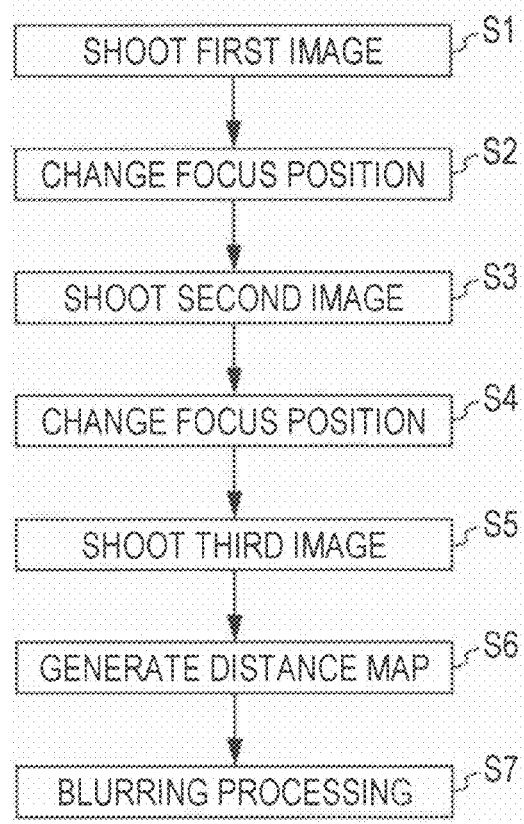
FIG. 3 is a flowchart used for overall explanation of blurring processing according to the first embodiment of the present disclosure.

In step S7 in FIG. 3, blurring processing is performed in accordance with the value of k at individual pixel positions calculated in the image. That is to say, if the value of k is large, more intensive blurring processing is performed. And if the value of k is small, more weak blurring processing is performed or the blurring processing is not performed. It becomes possible to obtain an image that has a suitably blurred background and is preferable for viewing by performing such blurring processing.

As described below, a relative physical distance $s_f$ between the foreground position and the background position is obtained using the calculated k, and the blurring processing in step S7 may be performed using $s_f$.

First, in general, the following Expression 3 is derived from an expression of a thin lens in geometrical optics.

$$s_f = \frac{f^2(s-f)}{f^2 - \delta F(s-f)} + f \quad (3)$$

In Expression 3, f is a focal length, F is an f-number, is a focus distance, δ is a diameter of a circle of confusion, and $s_f$ is a far-side subject distance. The values of f, F, s are control values of a lens, and thus are given. Accordingly, if δ is determined, $s_f$ can be obtained. Geometric-optically, a blur function is expressed as a Pill Box function of a diameter of a certain circle of confusion. Here, the average value of $\sigma_3$ and $\sigma_2$ that are obtained from Expression 2 is approximately regarded as a circle of confusion. For δ in Expression 3, Expression 4 is assigned.

$$\frac{\sigma_3 + \sigma_2}{2} = \frac{k\sigma_f^2}{2(\sigma_3 - \sigma_2)} \quad (4)$$

$$s_f = \frac{f^2(s-f)}{f^2 - \frac{k\sigma_f^2 F(s-f)}{(\sigma_3 - \sigma_2)}} + f \quad (5)$$

The blurring processing in step S7 may be performed using the relative separation distance $S_f$ between the foreground position and the background position that are obtained from Expression 5.

"Influence by Image Height"

Now, k or $s_f$, which have been derived so far, are based on the assumption that a blur function is a two-dimensional isotropic Gaussian function as expressed by Expression 1. As described above, a blur function is geometric-optically obtained as a Pill Box function, but is often approximated to a two-dimensional isotropic Gaussian function in consideration of the influence of diffraction and aberration in a real lens.

However, a blur function of a real lens deviates from a two-dimensional isotropic Gaussian function. Further, although two-dimensional isotropy is maintained at the center of an image corresponding to an optical axis, two-dimensional isotropy collapses widely in the periphery of the image having a high image height. The blur function of a real lens is determined by a design of the lens, and thus a change in the blur function can be estimated in advance. The changes in the blur function depending on places influence the occurrence of estimation errors of k or $s_f$. Accordingly, the quality of the image to which blurring processing is applied is deteriorated in the end. A description will be given of this influence as follows.

Figure 9:
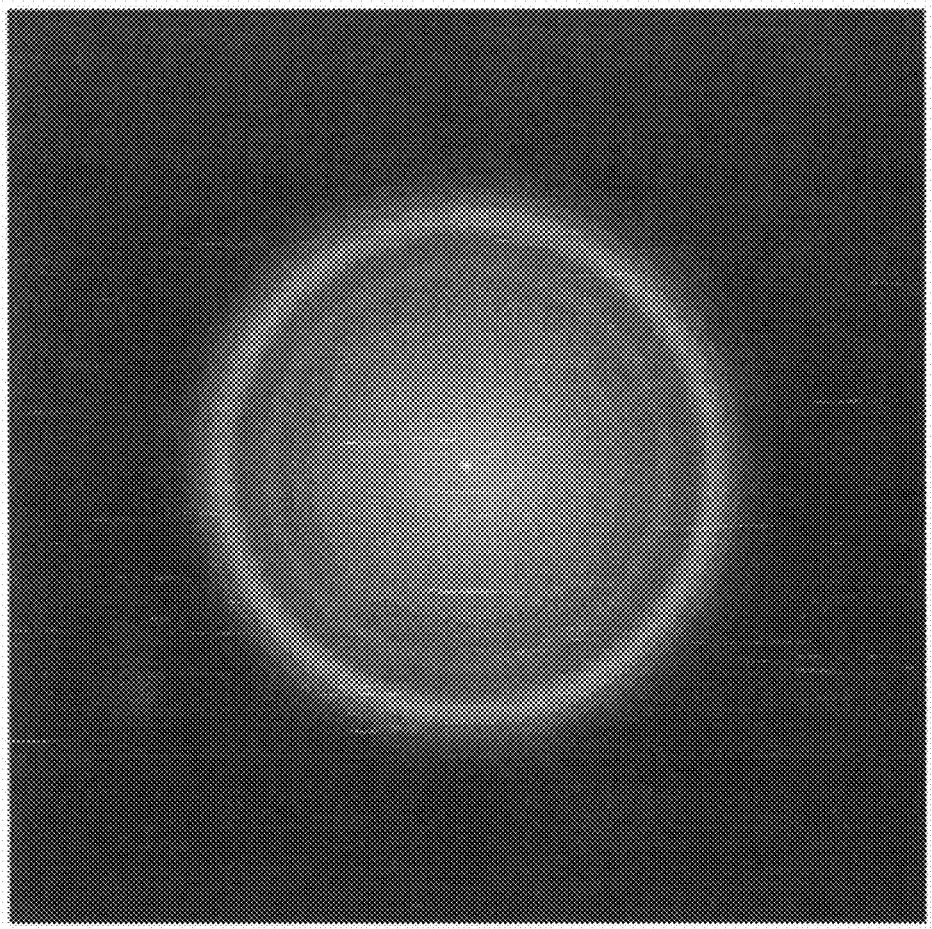
FIG. 9 is a diagram for explaining a change in a blurring function by image height.
Figure 10:
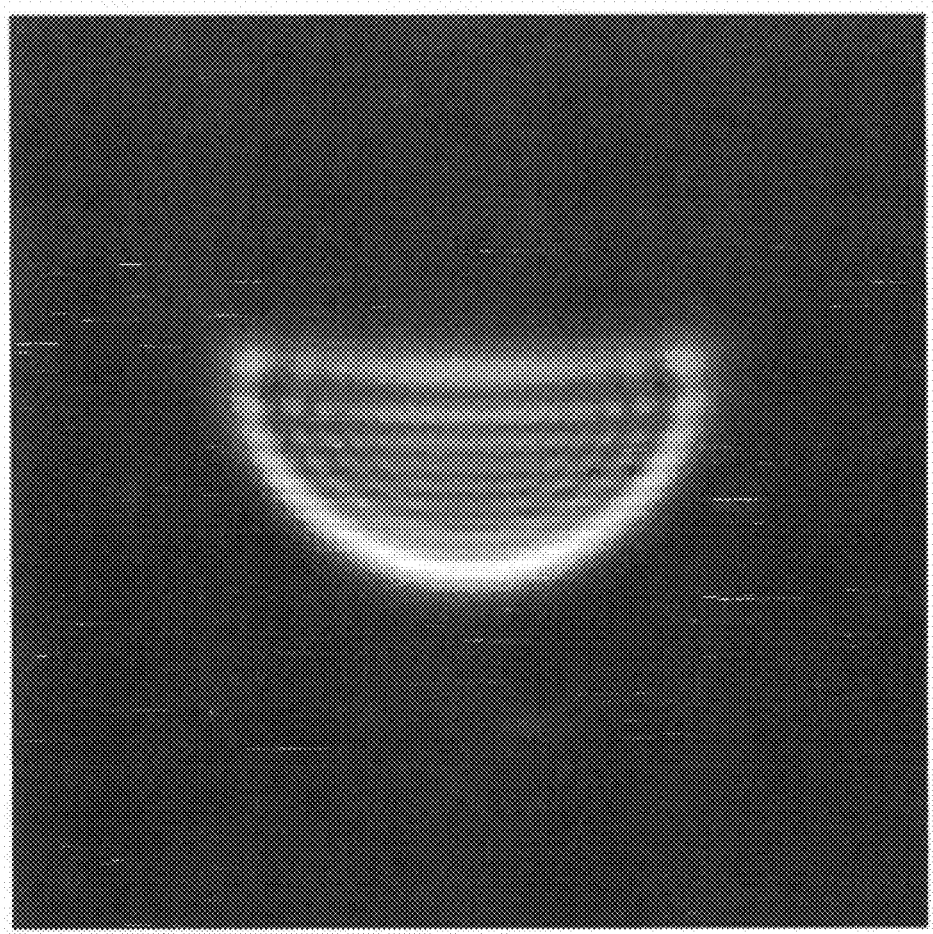
FIG. 10 is a diagram for explaining a change in a blurring function by image height.

FIG. 9 is an example of a PSF (Point Spread Function) at the time of defocus by image height 0 tenth of a real lens. FIG. 10 is an example of a PSF at the time of defocus by a high image height of a real lens. The PSF represents a spread of a point subject on an image surface, and thus represents a blur function itself.

At image height 0 tenth, the blur function is not a two-dimensional Gaussian function, but has isotropy. However, at a high image height, the blur function is aisotropic. In particular, at a high image height, in general, the spread width of PSF often has a tendency of becoming small in the meridional direction compared to the sagittal direction by the influence of vignetting in the periphery. The meridional direction is a radial direction with respect to an optical axis, and the sagittal direction is a concentric direction with respect to the optical axis, which is perpendicular to the meridional direction.

Here, an error of distance estimation in such a blur function is considered. As described above, distance estimation is carried out by Expression 2. The values $\sigma_3$ and $\sigma_2$ in Expression 2 are standard deviations when a blur function is regarded as a two-dimensional Gaussian function. Even if the shape of a blur function deviates from a Gaussian function, in general, it can be thought that the spread width of a blur function corresponds to $\sigma_3$ and $\sigma_2$.

Here, a comparison is made between the case of image height 0 tenth and the case of a high image height with reference to FIG. 9 and FIG. 10. In the case of a high image height, the spread of a blur function in the meridional direction particularly becomes small, and thus a phenomenon occurs in which the value of $\sigma_3$ and $\sigma_2$ becomes smaller in the case of a high image height than in the case of image height 0 tenth. As a result, the estimate value of distance information k becomes smaller in the case of a high image height than in the case of image height 0 tenth.

Figure 11:
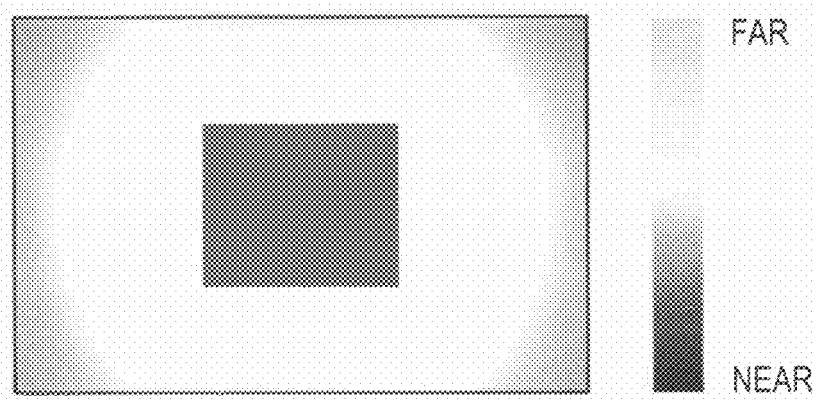
FIG. 11 is a diagram for explaining an example of a distance map.

An example of a distance map estimated in such circumstances is shown in FIG. 11. As subjects, it is assumed that there are an image including a planar background disposed at a far position with a same distance and a square object (foreground) disposed at a near position. In the distance map, it is shown that the thicker part of the map is, the nearer the part is disposed.

The object at the near distance, positioned at a low image height, and a background in the vicinity of the center of the image are thick on the distance map, and are suitably distance-estimated. On the other hand, on the periphery of the image, positioned at the high image height, an estimated distance value of the background becomes small by the influence of the above-described error. When blurring processing is performed in step S7 on the basis of a distance map including such an error, in the background portion, which should to be suitably subjected to blurring processing originally, has a less amount of blur than a right value in the periphery of the image. As a result, an improper image for viewing is generated.

"Processing by First Embodiment"

In order not to be affected by an error of distance estimation, which is caused by the shape of the above-described blur function, in the first embodiment of this disclosure, the processing described below is performed.

First, as a Gaussian filter to be used in step S11 (refer to FIG. 4), for example, a Gaussian filter having filter coefficients shown in the following Expression 6 is used.

$$G_1 = \frac{1}{64} \times \begin{pmatrix} 1 & 6 & 1 \\ 6 & 36 & 6 \\ 1 & 6 & 1 \end{pmatrix} \quad (6)$$

It is assumed that when the blur functions in FIG. 9 and FIG. 10 are approximated as Gaussian functions, the individual standard deviations thereof are described as below.

$\sigma_{center}$: standard deviation in the case of approximating blur function having 0 tenth of image height in FIG. 9 to a two-dimensional Gaussian function $\sigma_{mer}$: standard deviation in the case of approximating a meridional direction shape of a high image-height blur function in FIG. 10 to a one-dimensional Gaussian function $\sigma_{sag}$: standard deviation in the case of approximating a sagittal direction shape of a high image-height blur function in FIG. 10 to a one-dimensional Gaussian function Here, it is assumed that $\sigma_{center} \cong \sigma_{sag} > \sigma_{mer}$.

When a two-dimensional isotropic filter expressed by Expression 6 is uniformly applied to an entire image, as described above, the values of $\sigma_3$ and $\sigma_2$ becomes small in the case of a high image height. On the other hand, the value of $\sigma_f$ is constant for the entire image, and the value of k becomes small in a high image height, and an error occurs.

In order to avoid an error caused by a decrease in k in such a high image height, in Expression 2, the value of $\sigma_f$ is decreased as the values of $\sigma_3$ and $\sigma_2$ becomes small, and thereby the influence of the decrease is offset. As a result, it is possible to reduce an error caused by a decrease in k.

$\sigma_{(161)}$: is assumed to be a standard deviation of [1 6 1] filter coefficients. A Gaussian filter whose standard deviation is $$\sigma_{(161)} \times (\sigma_{mer}/\sigma_{center})$$

is [1 14 1], a [1 6 1] filter is applied in a sagittal direction, and a [1 14 1] filter is applied in a meridional direction. That is to say, two-dimensional filters $G_{2a}$ and $G_{2b}$ in the following Expression 7 are applied to the case of a high image height as shown in FIG. 10. As a result, the value of k becomes larger than the case of using $G_1$, and thus an error of k can be reduced.

$$G_{2a} = \frac{1}{128} \times \begin{pmatrix} 1 & 6 & 1 \\ 14 & 84 & 14 \\ 1 & 6 & 1 \end{pmatrix} \quad (7)$$

$$G_{2b} = \frac{1}{128} \times \begin{pmatrix} 1 & 14 & 1 \\ 6 & 84 & 6 \\ 1 & 14 & 1 \end{pmatrix}$$

Figure 12:
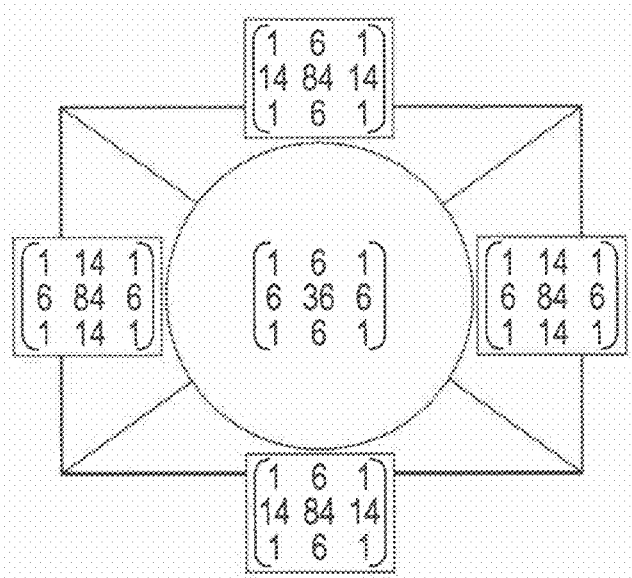
FIG. 12 is a schematic diagram for explaining an example of a method of changing Gaussian filters in accordance with image height.

As shown in FIG. 12, an image is divided into four areas by diagonal lines, a circular area in the vicinity of center is an area having a low image height, four areas which are produced by excluding the low-image-height areas from the original four areas are high-image-height area. A two-dimensional Gaussian filter $G_1$ is applied to the low-image-height areas, a two-dimensional Gaussian filter $G_{2a}$ is applied to the upper and the lower high-image-height areas, and a two-dimensional Gaussian filter $G_{2b}$ is applied to the right and the left high-image-height areas.

Figure 13:
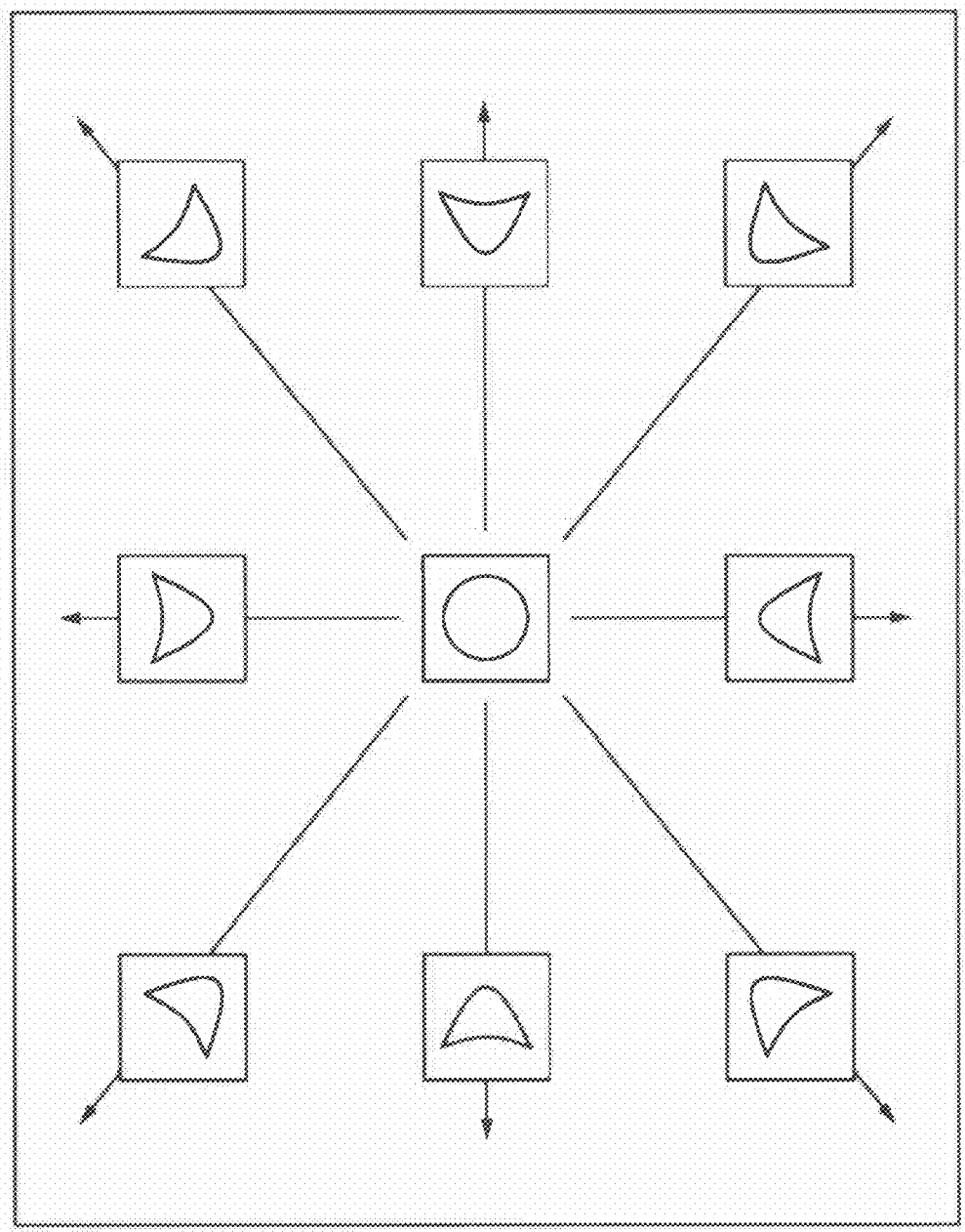
FIG. 13 is a schematic diagram for explaining a change in shape of a blurring function by image height.

Changing the Gaussian filters depending on a direction is because a change in a blur function of high image height is rotationally symmetrical as shown in FIG. 13, and thus a change of blur functions and changing the filters are matched. That is to say, in the sagittal direction, two kinds of filters $G_{2a}$ and $G_{2b}$ are changed, and in the meridional direction, two kinds of filters $G_1$ and $G_{2a}$ (or $G_{2b}$) are changed.

In this regard, the way of changing filters is not limited to this. In order to more delicately correspond to a blur function changing in accordance with image height, many kinds of filters may be used in the sagittal direction or in the meridional direction. As a result, it becomes possible to further reduce errors of k.

Further, in the above-described example, the standard deviation of the filter applied to the meridional direction is smaller than the standard deviation of the filter applied to the sagittal direction so that an effect of making $\sigma_f$ small is obtained. However, the same effect can be obtained using a two-dimensional isotropic Gaussian function having a smaller standard deviation than that of $G_1$.

In this case, $\sigma_{high}$: standard deviation in the case of approximating the high-image-height blur function in FIG. 10 to a two-dimensional Gaussian function $$\sigma_{(161)} \times (\sigma_{high}/\sigma_{center})$$

A two-dimensional isotropic Gaussian filter having the above characteristic ought to be used.

2. Variation of First Embodiment

A description will be given of a variation of the first embodiment. In order to make it easy to understand, general descriptions on the first embodiment, etc., are also given.

Figure 14:
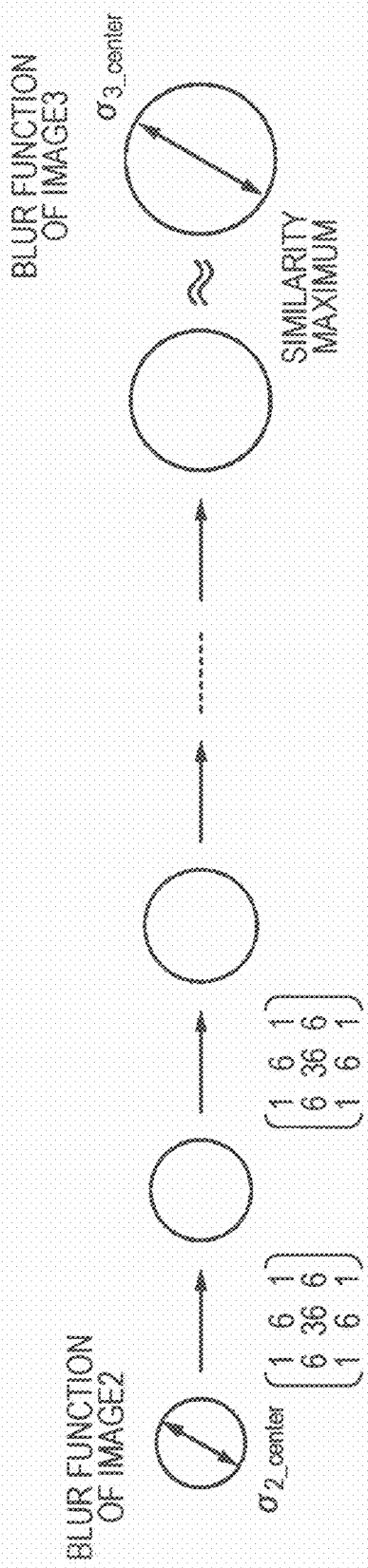
FIG. 14 is a schematic diagram for explaining an example of processing performing convolution operation on a low-image-height area using a two-dimensional isotropic Gaussian function.

FIG. 14 schematically illustrates convolution operation processing performed in order to generate a distance information in a low-image height area. Standard deviations in the case of approximating the blur functions of image2 and image3 to Gaussian functions are assumed to be as follows, respectively.

$\sigma_{2\_center}$: standard deviation in the case of approximating the blur function having 0 tenth of image height of image2 to a two-dimensional Gaussian function $\sigma_{3\_center}$: standard deviation in the case of approximating the blur function having 0 tenth of image height of image3 to a two-dimensional Gaussian function As described above, the blur function in a low-image-height area of image2 has isotropy. When convolution operation is performed on the blur function in a low-image-height area using a two-dimensional isotropic Gaussian function, the blur is expanded. The blur is expanded so that the value of $\sigma_{2\_center}$ becomes high. As a result, the value of $\sigma_{2\_center}$ substantially matches the value of $\sigma_{3\_center}$, and thus similarity with high precision is obtained.

Figure 15:
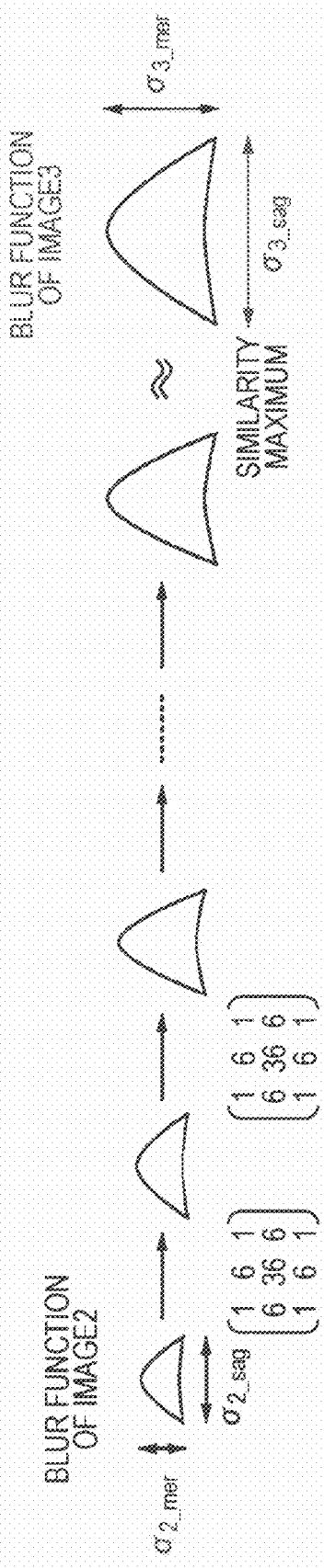
FIG. 15 is a schematic diagram for explaining an example of processing performing convolution operation on a high-image-height area using a two-dimensional isotropic Gaussian function.

FIG. 15 schematically illustrates convolution operation processing performed for generating distance information in a high-image-height area. The blur functions of image2 and image3 shown in FIG. 15 are examples. For example, in FIG. 13, those blur functions are the blur functions in a high-image-height area at the lower side of the figure with respect to the vicinity of the center of the image (low-image-height area).

It is assumed that when the blur functions of the image2 and image3 shown in FIG. 15 are approximated as Gaussian functions, the individual standard deviations thereof are described as below.

$\sigma_{2\_mer}$: standard deviation in the case of approximating a meridional direction shape of a high-image-height blur function of image2 to a one-dimensional Gaussian function $\sigma_{2\_sag}$: standard deviation in the case of approximating a sagittal direction shape of a high-image-height blur function of image2 to a one-dimensional Gaussian function $\sigma_{3\_mer}$: standard deviation in the case of approximating a meridional direction shape of a high-image-height blur function of image3 to a one-dimensional Gaussian function $\sigma_{3\_sag}$: standard deviation in the case of approximating a sagittal direction shape of a high-image-height blur function of image3 to a one-dimensional Gaussian function As described above, in a high-image-height area, the blur function is anisotropic. In the example of the blur functions shown in FIG. 15, $\sigma_{2\_mer} < \sigma_{2\_sag}$ and $\sigma_{3\_mer} < \sigma_{3\_sag}$.

On the blur function in the high-image-height area of image2, convolution operation is performed using the two-dimensional isotropic Gaussian function. When the convolution operation is performed, a blur is expanded, and the value of $\sigma_{2\_mer}$ and the value of $\sigma_{2\_sag}$ increase at an equal ratio. When the convolution operation is performed a predetermined number of times, the value of $\sigma_{2\_mer}$, which is a smaller value of the standard deviation, and the value of $\sigma_{2\_sag}$ match substantially. At this timing, the similarity becomes maximum. However, the value of $\sigma_{2\_sag}$ and the value of $\sigma_{3\_sag}$ do not match. That is to say, an error has occurred. If distance estimation is performed in a state including an error, it is difficult to suitably perform blurring processing, and thus an unsuitable image is generated.

Figure 16:
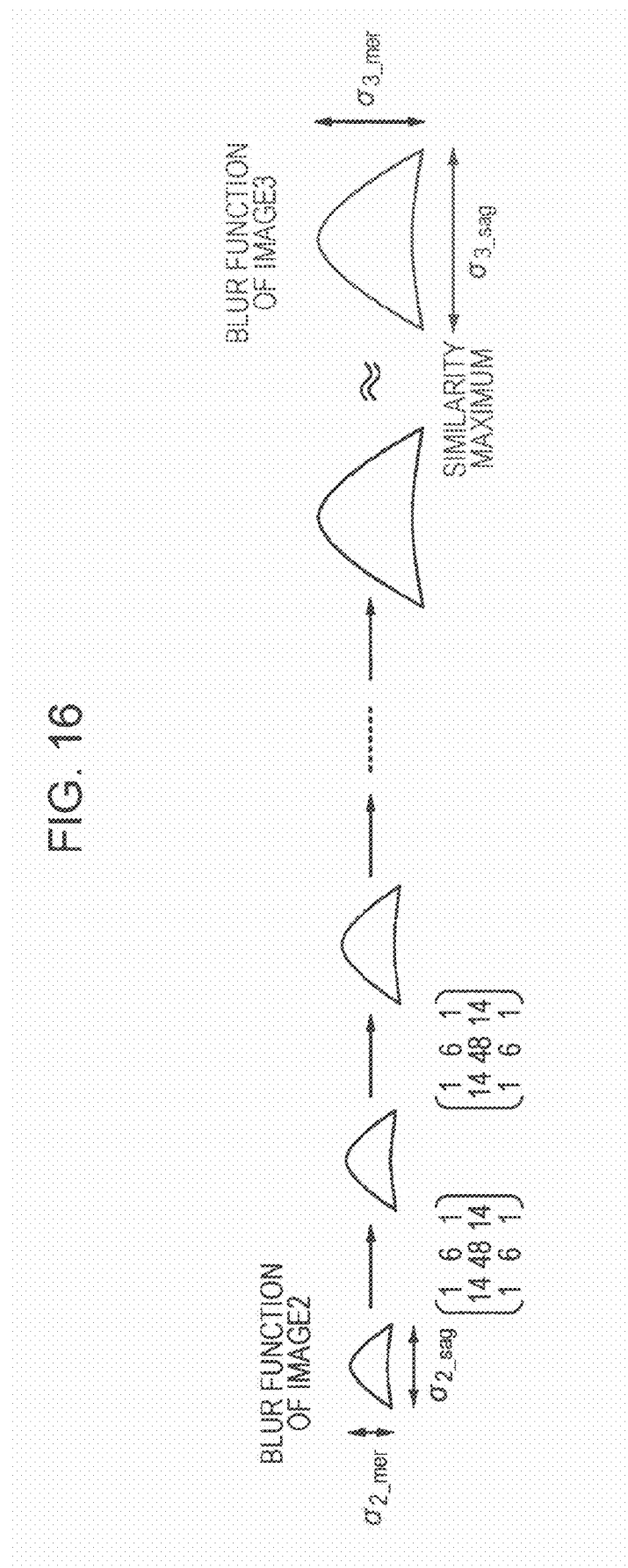
FIG. 16 is a schematic diagram for explaining processing performing convolution operation using a two-dimensional anisotropic Gaussian function in the first embodiment.

Thus, in the first embodiment, for example, convolution operation using the two-dimensional anisotropic Gaussian function is performed on the blur function in the high-image-height area of image2. As shown in FIG. 16, by performing the convolution operation using the two-dimensional anisotropic Gaussian function, it is possible to suitably increase the value of $\sigma_{2\_mer}$ and the value of $\sigma_{2\_sag}$. The similarity becomes a maximum value when the value of $\sigma_{2\_mer}$ and the value of $\sigma_{2\_sag}$ substantially match the value of $\sigma_{3\_mer}$ and the value of $\sigma_{3\_sag}$, respectively, and an error does not occur. Accordingly, it is possible to perform distance estimation with high precision.

Figure 17:
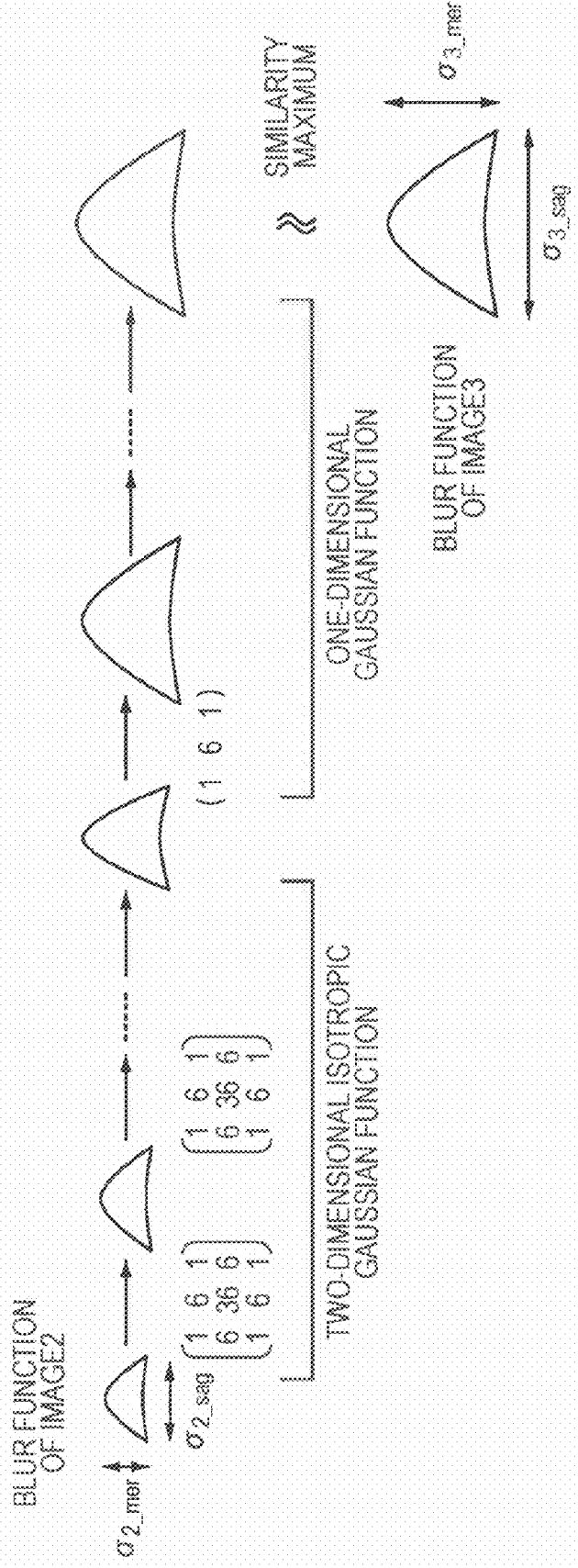
FIG. 17 is a schematic diagram for explaining an example of processing in a variation of the first embodiment.

In the variation, for example, convolution operation is performed on the blur function in the high-image-height area using the two-dimensional isotropic Gaussian function and the one-dimensional Gaussian function. FIG. 17 schematically illustrates the processing in which the convolution operation using the two-dimensional isotropic Gaussian function and the convolution operation using the one-dimensional Gaussian function is performed on the blur function of the high-image-height area of the image2.

For example, first, convolution operation using the two-dimensional isotropic Gaussian function is performed on the blur function of image2. By performing the convolution operation using the two-dimensional isotropic Gaussian function, the value of $\sigma_{2\_mer}$ and the value of $\sigma_{2\_sag}$ increase. At the timing when the convolution operation using the two-dimensional isotropic Gaussian function is performed, for example, M times, the value of $\sigma_{2\_mer}$ and the value of $\sigma_{2\_sag}$ match. After this timing, the filter to be used is changed from the two-dimensional Gaussian filter to the one-dimensional Gaussian filter, and the convolution operation using the one-dimensional Gaussian function is performed. That is to say, the blur function to which the convolution operation using the two-dimensional isotropic Gaussian function has been performed is subjected to the convolution operation using the one-dimensional Gaussian function.

The convolution operation using the one-dimensional Gaussian function is performed so that the blurring processing is performed only on the sagittal-direction image component. By this blurring processing, only the value of $\sigma_{2\_sag}$ increases, and the value of $\sigma_{2\_mer}$ will not change. At the timing when the convolution operation using the one-dimensional Gaussian function is performed, for example, N times, the value of $\sigma_{2\_sag}$ and the value of $\sigma_{3\_sag}$ substantially match. At this timing, the similarity between the blur function of image2 and the blur function of image3 becomes a maximum value. And the sum ((M+N) times) of the number of times the convolution operation is performed using the two-dimensional isotropic Gaussian function and the number of times the convolution operation is performed using the one-dimensional Gaussian function is used as distance information k. In this manner, for example, first, the convolution operation using the two-dimensional isotropic Gaussian function may be performed, and then the convolution operation using the one-dimensional Gaussian function may be performed. By this processing, the similarity with higher precision is obtained. As a result, distance information with higher precision is obtained.

In this regard, the blur functions shown from FIG. 14 to FIG. 17 are examples. For example, in the case of a blur function having a relationship $\sigma_{2\_mer} > \sigma_{2\_sag}$, the convolution operation using the two-dimensional isotropic Gaussian function is performed M times, and then the blurring processing is performed only on an image component in the meridional direction. The blurring processing is performed by the convolution operation using the one-dimensional Gaussian function.

In this manner, filters having different characteristics are used in accordance with a change in blur based on the image height. In the first embodiment, as an example of filters having different characteristics, two-dimensional Gaussian filters having different coefficients are used, for example individually, in the low-image-height area and in the high-image-height area. In the variation of the first embodiment, as an example of filters having different characteristics, for example, the two-dimensional Gaussian filter is used in the low-image-height area. In the high-image-height area, the two-dimensional Gaussian filter used in the low-image-height area and the one-dimensional Gaussian filter are used. In this manner, the one-dimensional Gaussian filter and the two-dimensional Gaussian filter are selectively used to perform the blurring processing.

Figure 18:
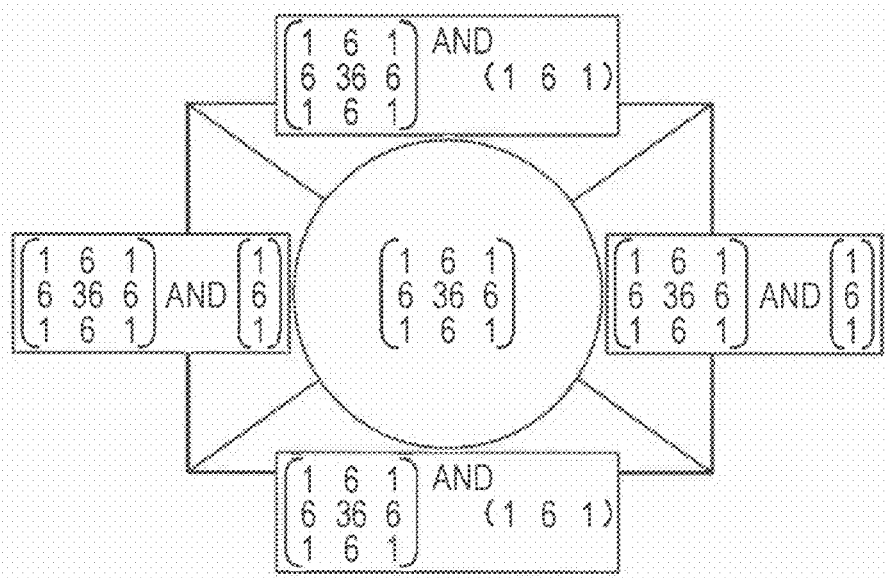
FIG. 18 is a schematic diagram for explaining an example of a method of changing filters in accordance with an image height of a Gaussian filter in the variation of the first embodiment.

FIG. 18 illustrates an example of filter coefficients to be applied in accordance with the area of an image. An image is divided into four areas, for example. The vicinity of the center of the image is a low-image-height area, and the remaining areas produced by excluding the low-image-height area from the four areas are high-image-height areas. The two-dimensional Gaussian filter is applied to the low-image-height areas. The two-dimensional Gaussian filter and the one-dimensional Gaussian filter are applied to the high-image-height areas. For the one-dimensional Gaussian filter, for example, a horizontal filter is applied to the upper and the lower areas of the figure of the high-image-height areas. A vertical filter is applied to the left and the right areas of the figure of the high-image-height areas.

FIG. 19 is a flowchart illustrating an example of processing in the variation. The processing described in the following is, for example, performed by the CPU 51. The processing shown in FIG. 19 is performed, for example, for each block with a predetermined pixel of image2 as center. The processing is performed for all the blocks in image2, and finally, distance information for each pixel is obtained.

In step S21 in FIG. 19, the two-dimensional Gaussian filter is applied to a predetermined block of image2 (subjected to convolution). And the processing proceeds to step S22. In step S22, similarity is calculated between the block of image2 to which the two-dimensional Gaussian filter is applied and the same block of image3. The calculated similarity is stored.

In parallel with the processing in step S21 and step S22, processing in step S23 and step S24 is performed. In step S23, the one-dimensional Gaussian filter is applied to a predetermined block of image2. And the processing proceeds to step S24. In step S24, similarity is calculated between the block of image2 to which the one-dimensional Gaussian filter has been applied and the same block of image3. The calculated similarity is stored.

And the processing proceeds to step S25. In step S25, a determination is made of whether the similarity calculated in step S22 has decreased less than the similarity (when the processing in step S22 is performed first time, the similarity with respect to an image on which the blurring processing of step S21 has not been performed) calculated at the previous time. Further, a determination is made of whether the similarity calculated in step S24 has decreased less than the similarity (when the processing in step S24 is performed first time, the similarity with respect to an image on which the blurring processing of step S23 has not been performed) calculated at the previous time. And if both of the similarities have not decreased, the processing proceeds to step S26.

In step S26, the image that has output higher similarity is selected out of the similarities in step S22 and step S24. For example, if the similarity calculated in step S22 is higher than the similarity calculated in step S24, the image to which the two-dimensional Gaussian filter has been applied is selected. The selected image is output as a Gaussian-filter-applied image. The output Gaussian-filter-applied image is used as the input image. The processing in step S21, step S22, step S23, step S25, and step S26 is performed on the input image, and the processing goes round the loop of the processing from step S21 to step S26.

In step S25, if the similarity calculated in step S22 has decreased less than the similarity calculated at the previous time, and, if the similarity calculated in step S24 has decreased less than the similarity calculated at the previous time, the processing proceeds to step S27. In step S27, a number of loops of the processing from step S21 to step S26 that has been executed is obtained. The obtained number of loops is output as distance information k.

Here, a description will be given of why errors are preferably reduced by the above-described method. As described above, a PSF shape in high image height deviates from a rotationally symmetrical PSF shape at the center of the image by vignetting. Since $\sigma\_{center} \cong \sigma\_{sag} > \sigma\_{mer}$, in the case of estimating a distance using only the two-dimensional Gaussian filter, a smaller value compared with an estimation distance at the center of the image is obtained as an estimated value. Here, by noticing that $\sigma\_{center} \cong \sigma\_{sag}$, a one-dimensional Gaussian filter performing the blurring processing only on the image component in the sagittal direction is used at the same time, and thus a smaller value is obtained as the similarity. Accordingly, a distance estimation value with high precision is obtained.

In this regard, in the processing shown in FIG. 19, the number of loops when both of the similarities have decreased is used as distance information k. Here, (the number of loops when both of the similarities have decreased −1) may be used as distance information k. In this manner, by obtaining distance information k, it is possible to output the number of loops at the timing when the similarity becomes a maximum value as distance information k.

In this regard, processing in a variation can be achieved by the processing shown by a flowchart in FIG. 20. The processing described in the following is, for example, performed by the CPU 51. The processing shown in FIG. 20 is performed, for example, for each block with a predetermined pixel of image2 as center. The processing is performed for all the blocks in image2, and finally, distance information for each pixel is obtained.

In step S31, the two-dimensional Gaussian filter is applied to a predetermined block of image2. And the processing proceeds to step S32. In step S32, similarity is calculated between the image to which the two-dimensional Gaussian filter is applied and the image of the same block of image3. The calculated similarity is stored. And the processing proceeds to step S33.

In step S33, a determination is made of whether the similarity calculated in step S32 has decreased less than the similarity (when the processing in step S32 is performed first time, the similarity with respect to an image on which the blurring processing of step S31 has not been performed at all) calculated at the previous time. As a result of the determination, if the similarity has not decreased, the processing goes round the loops of the processing of step S31, step S32, and step S33 using the image on which blurring processing is performed in step S31 as an input image. In step S33, if the similarity calculated in step S32 has decreased less than the similarity calculated at the previous time, the processing proceeds to step S34.

In step S34, one-dimensional Gaussian filter is applied to the input image. The input image in step S34 is a blurred image at the point in time when determined that the similarity has decreased in step S33. To put it in another way, the image to which the two-dimensional Gaussian filter has been applied last becomes the input image. When the one-dimensional Gaussian filter is applied to the input image, the processing proceeds to step S35.

In step S35, similarity is calculated between the image to which the one-dimensional Gaussian filter has been applied in step S34 and the image of the same block of image3. The calculated similarity is stored. And the processing proceeds to step S36. In step S36, a determination is made of whether the similarity calculated in step S35 has decreased less than the similarity (when the processing in step S35 is performed first time, the similarity with respect to an image on which the blurring processing of step S34 has not been performed at all) calculated at the previous time.

As a result of the determination, if the similarity has not decreased, the loop of the processing in step S34, step S35, and step S36 is repeated using the image on which blurring processing has been performed in step S34 as input image. In step S36, if the similarity calculated in step S35 has decreased less than the similarity calculated at the previous time, the total number of loops is output as distance information k. That is to say, the sum of the number of loops of the processing from step S31 to step S33 and the number of loops of the processing from step S34 to step S36 is output as distance information k.

In this regard, the image to which the two-dimensional Gaussian filter has been applied at the previous time may be stored in a memory. And in the processing from step S33 to step S34, the image stored in the memory may be used as the input image, and the one-dimensional Gaussian filter may be applied to the image stored in the memory. For example, it is assumed that at the stage when the two-dimensional Gaussian filter had been applied to the image2 M times, the similarity has decreased less than the similarity of the previous time. At this time, the determination in step S33 becomes "Yes". In the subsequent processing in step S34, the previous image stored in the memory, that is to say, the image to which the two-dimensional Gaussian filter has been applied (M−1) times is input. The one-dimensional Gaussian filter may be applied to the input image.

When the two-dimensional Gaussian filter is applied to image2, the similarity increases. The fact that the similarity decreases in the determination in step S33 means that image2 to which the two-dimensional Gaussian filter has been applied at one time before that point in time resembles the image3 most. The one-dimensional Gaussian filter is applied to the most resembled image so that the similarity with higher precision is obtained. As a result, distance information with high precision is obtained.

The same thing can be said to the processing from step S34 to step S36. For example, it is assumed that when the number of loops of the processing from step S34 to step S36 has reached N times, the determination in step S36 becomes "Yes". For the same reason as described above, the image produced by applying the one-dimensional Gaussian filter to the input image (N−1) times resembles the image3 most. And the sum of (M−1) and (N−1) may be output as distance information k. The sum of the loops of when the similarity becomes highest in each processing is used as distance information, and thus distance information with high precision is obtained.

In this regard, the two-dimensional Gaussian filter may be applied to the blur function in a low-image-height area, and the one-dimensional Gaussian filter having different coefficients may be applied to the blur function in a high image height. For example, a horizontal filter is applied to the blur function in a high-image-height area. When the similarity becomes highest, a vertical filter is applied to the image to which the horizontal filter has been applied. When the similarity becomes highest, the sum of the number of times the horizontal filter is applied and the number of times the vertical filter is applied may be used as distance information k.

FIG. 21 is a schematic diagram illustrating an example of a relationship between the number of processing loops and the similarity. At first, at the time of starting the processing loop, the similarity becomes higher in the case of using a two-dimensional Gaussian filter than in the case of using a one-dimensional Gaussian filter. Accordingly, the two-dimensional Gaussian filter is used. When the processing is continued, from a certain point in time, the higher similarity is calculated in the case of using the one-dimensional filter than in the case of using the two-dimensional filter. Accordingly, the one-dimensional Gaussian filter is used. Finally, the processing loop terminates when the similarity becomes a maximum value, and distance information k is output.

3. Second Embodiment

In the first embodiment and the variation of the first embodiment, an application example is shown in which a distance map is detected by a spatial filter. Next, in a second embodiment, an application example is shown in which a distance map is detected in frequency domain.

An overall block diagram and a general processing flow according to the second embodiment are the same as those of the first embodiment shown in FIG. 1, FIG. 2 and FIG. 3. The method of step S6 (distance map generation) is different as follows.

It is assumed that coordinates of each pixel of the obtained second image and third image are x and y, the obtained images are $d_2(x, y)$ and $d_3(x, y)$, the blur functions are $h_2(x, y)$, $h_3(x, y)$, an image in focus without a blur is $f(x, y)$. These relationships are expressed by the following Expression 8 and Expression 9.

$$d_2(x,y) = h_2(x,y) \otimes f(x,y) \quad (8)$$

$$d_3(x,y) = h_3(x,y) \otimes f(x,y) \quad (9)$$

Here, $h_2(x, y)$ and $h_3(x, y)$ are approximated to Gaussian functions having standard deviations $\sigma_2$ and $\sigma_3$, respectively, in the same manner as the first embodiment.

When Expression 8 and Expression 9 are described in frequency domain, assuming that the frequency axes corresponding to x and y of the obtained second image and third image are $\omega$ and $v$, respectively, the obtained images having been subjected to frequency transformation (DFT: Discrete Fourier Transform) are $D_2(\omega, v)$ and $D_3(\omega, v)$, the blur functions having been subjected to frequency transformation are $H_2(\omega, v)$ and $H_3(\omega, v)$, and the image in focus without a blur that has been subjected to frequency transformation is $F(\omega, v)$, the individual relationships are expressed as follows.

$$D_2(\omega,v) = H_2(\omega,v) F(\omega,v) \quad (10)$$

$$D_3(\omega,v) = H_3(\omega,v) F(\omega,v) \quad (11)$$

By eliminating $F(\omega, v)$ from Expression 10 and Expression 11, the following expression is obtained.

$$k' = \sigma_3^2 - \sigma_2^2 = \frac{-2}{\omega^2 + v^2} \log \frac{D_3(\omega, v)}{D_2(\omega, v)} \quad (12)$$

A subject distance varies by a subject for each pixel in an image. The value of k' obtained by Expression 12 in a pixel area of q×q with a certain pixel position (a pixel position of interest) (x0, y0) as center of the second image and the third image can be regarded as distance information at (x0, y0) in a similar manner that k is assumed to be distance information in Expression 2. Here, in the calculation of k' by Expression 12, a value produced by the calculation using specific values of $\omega$ and $v$ may be used. Further, in order to further improve the estimated precision, it is possible to use the average of the values calculated in each frequency expressed in Expression 13 as distance information.

$$k'_C = \int \int \frac{-2}{\omega^2 + v^2} \log \frac{D_3(\omega, v)}{D_2(\omega, v)} d\omega dv \quad (13)$$

Here, as shown by Expression 12, the estimated k' is a difference between the squared standard deviations of the Gaussian blur functions of the third image and the second image. Thus, in the same manner as the first embodiment, an error, which is caused by dependency of the image height of a blur function, occurs. That is to say, in the case of a low image height, the value of k' becomes smaller than in the case of a high image height, and an error occurs.

In the second embodiment according to this disclosure, in order to reduce such an error, as shown in the following Expression 14, distance-information estimation calculation is changed depending in an image height. That is to say, the change is carried out by two stages. At the time of a high image height, k' is produced by multiplying k' at the time of low image height by a correction coefficient α.

$$k' = \frac{-2}{\omega^2 + v^2} \log \frac{D_3(\omega, v)}{D_2(\omega, v)} \text{ (at the time of low image height)} \quad (14)$$

$$k' = \alpha \frac{-2}{\omega^2 + v^2} \log \frac{D_3(\omega, v)}{D_2(\omega, v)} \text{ (at the time high image height)}$$

Here, as shown in Expression 15, α is a value produced by dividing a standard deviation in the case of approximating a blur function at a low image height to a two-dimensional isotropic Gaussian function by a standard deviation in the case of approximating a blur function at a high image height to a two-dimensional isotropic Gaussian function.

$$\alpha = \frac{\sigma_{center}}{\sigma_{high}} \quad (15)$$

By the correction coefficient α, an error of k' at a high image height is reduced, precision of the distance estimation is improved. Finally, it is possible to improve the quality of an image on which the blurring processing is performed in step S7.

In this regard, here, an example of changing between two stages, a low image height and a high image height is shown. However, it is possible to employ a method of increasing changing stages further to increase precision.

4. Variations

Specific descriptions have been given of embodiments of the present disclosure. However, the present disclosure is not limited to the above-described embodiments, and various variations are possible on the basis of the spirit and scope of this disclosure. For example, an example is shown in which Gaussian filters are changed depending on the difference of whether a low image height or a high image height. Further, it is possible to reduce variations of distance estimation precision caused by variations of blur functions derived from variations of lenses. In this case, it is possible to measure a blur function for each one unit, and to adjust $G_{2a}$ and $G_{2b}$ in the first embodiment, or the value of α in the second embodiment for each one unit.

Further, in the above-described embodiments, focus positions are changed and a plurality of images are obtained, and a distance map is generated on the basis of the difference in the blur functions of those images. However, a plurality of images are obtained by changing apertures, and a distance map may be generated on the basis of the difference in the blur functions of those images. Further, in the above-described embodiments, a distance map is used for blurring processing as an example. In addition, a distance map may be used for generation processing of a stereo image using a plurality of disparity images, or generation processing of a depth-of-field expanded image by deconvolution in accordance with a distance.

In this regard, the present disclosure can also have the following configuration.

(1)

An image processing apparatus including: an input section receiving input of first image data obtained by shooting a subject in a first optical-system state of an imaging section, and second image data obtained by shooting the subject in a second optical-system state of the imaging section with a blur state different from a blur state of the first image data; and a distance-information calculation section calculating distance information corresponding to a position in a depth direction of the subject on the basis of the first image data and the second image data, wherein the distance-information calculation section calculates the distance information having a corrected change in a blur by an image height of the optical system.

(2)

The image processing apparatus according to (1), wherein the distance-information generation section performs blurring processing adding a blur to the first image data by a filter, determines similarity between the first image data with the blur added and the second image data, detects a number of blurring processing having a maximum value of the similarity, obtains the distance information from the detected number of the blurring processing, and in the blur processing, corrects the change in the blur by the image height of the optical system.

(3)

The image processing apparatus according to (1) or (2), wherein the number of blurring processing is determined on the assumption that the number of blurring processing is zero in the case of processing without adding of a blur.

(4)

The image processing apparatus according to any one of (1) to (3), wherein the first optical-system state and the second optical-system state are states having different focus positions with each other.

(5)

The image processing apparatus according to any one of (1) to (3), wherein the first optical-system state and the second optical-system state are states having different apertures with each other.

(6)

The image processing apparatus according to any one of (2) to (5), wherein the filter is a two-dimensional Gaussian filter, and a standard deviation of the two-dimensional Gaussian filter is set to correct the change in the blur by the image height.

(7)

The image processing apparatus according to any one of (2) to (6), wherein the distance-information calculation section calculate the distance information using a filter having a different characteristic depending on a change in the blur by the image height.

(8)

The image processing apparatus according to any one of (1) to (7), wherein the distance-information calculation section calculate the distance information using a filter having a different characteristic depending on the change in the blur by the image height.

(9)

The image processing apparatus according to any one of (2) to (7), wherein the filter includes a first filter and a second filter having a different characteristic from the first filter, and the blurring processing adds the blur selectively using the first filter and the second filter.

(10)

A method of processing an image of an image processing apparatus, the method including: receiving input of first image data obtained by shooting a subject in a first optical-system state of an imaging section, and second image data obtained by shooting the subject in a second optical-system state of the imaging section with a blur state different from a blur state of the first image data; and calculating distance information corresponding to a position in a depth direction of the subject on the basis of the first image data and the second image data, wherein the distance information is calculated by correcting a change in the blur by an image height of the optical system.

(11)

A program for causing a computer to perform a method of processing an image, the method including: receiving input of first image data obtained by shooting a subject in a first optical-system state of an imaging section, and second image data obtained by shooting the subject in a second optical-system state of the imaging section with a blur state different from a blur state of the first image data; and calculating distance information corresponding to a position in a depth direction of the subject on the basis of the first image data and the second image data, wherein the distance information is calculated by correcting a change in the blur by an image height of the optical system.

The present application contains subject matter related to that disclosed in Japanese Priority Patent Application JP 2010-112929 filed in the Japan Patent Office on May 17, 2010, and Japanese Priority Patent Application JP 2011-068343 filed in the Japan Patent Office on Mar. 25, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   circuitry configured to:
      receive input of first image data obtained by shooting a subject in a first optical-system state of an imaging device, and second image data obtained by shooting the subject in a second optical-system state of the imaging device with a blur state different from a blur state of the first image data; and
      calculate distance information corresponding to a position in a depth direction of a subject based on the first image data and the second image data,
      wherein the distance information is calculated based on a number of times a blurring processing is performed on the first image data
      wherein the first optical-system state and the second optical-system state are states having different apertures with each other.

2. The image processing apparatus according to claim 1, wherein the circuitry is configured to:
   perform the blurring processing by adding a blur to the first image data by a filter;
   determine similarity between the first image data with the blur added and the second image data;
   detect the number of times the blurring processing is performed to have a maximum value of the determined similarity; and
   correct, in the blur processing, a change in the blur by an image height.

3. The image processing apparatus according to claim 2, wherein the number of times of the blurring processing is determined based on an assumption that the number of times of the blurring processing is zero in a case of the blur processing without adding the blur.

4. The image processing apparatus according to claim 1, wherein the first optical-system state and the second optical-system state are states having different focus positions with each other.

5. The image processing apparatus according to claim 1, wherein the circuitry is configured to perform the blurring processing by adding a blur to the first image data by a filter,
   wherein the filter is a two-dimensional Gaussian filter, and a standard deviation of the two-dimensional Gaussian filter is set to correct a change in the blur by an image height.

6. The image processing apparatus according to claim 1, wherein the circuitry is configured to:
   perform the blurring processing by adding a blur to the first image data by a filter;
   determine similarity between the first image data with the blur added and the second image data; and
   detect a number of times the blurring processing is performed to have a maximum value of the determined similarity,
   wherein the number of times of the blurring processing is converted into a physical distance.

7. The image processing apparatus according to claim 1, wherein the circuitry calculates the distance information using a filter having a different characteristic depending on a change in a blur by an image height.

8. The image processing apparatus according to claim 1,
   wherein the circuitry is configured to perform the blurring processing to add a blur to the first image data selectively using a first filter and a second filter,
   wherein the second filter has a different characteristic from the first filter.

9. A method of processing an image of an image processing apparatus, the method comprising:
   receiving input of first image data obtained by shooting a subject in a first optical-system state of an imaging device, and second image data obtained by shooting the subject in a second optical-system state of the imaging device with a blur state different from a blur state of the first image data; and
   calculating distance information corresponding to a position in a depth direction of a subject on the basis of the first image data and the second image data,
   wherein the distance information is calculated based on a number of times a blurring processing is performed on the first image data
   wherein the blurring processing is performed by adding a blur to subjects other than those in a foreground of the first image data by a filter.

10. A non-transitory computer-readable medium storing computer-readable instructions thereon that when executed by a computer cause the computer to perform an image processing method comprising:
    receiving input of first image data obtained by shooting a subject in a first optical-system state of an imaging device, and second image data obtained by shooting the subject in a second optical-system state of the imaging device with a blur state different from a blur state of the first image data; and
    calculating distance information corresponding to a position in a depth direction of a subject on the basis of the first image data and the second image data,
    wherein the distance information is calculated based on a number of times a blurring processing is performed on the first image data,
    wherein the blurring processing is performed by adding a blur to the first image data or the second image data by a low-pass filter, wherein a cut-off frequency of the low-pass filter changes with the distance information.

11. The image processing apparatus according to claim 1, wherein the circuitry is configured to determine a distance map comprising the distance information of all pixels in the first image data and the second image data.

12. The image processing apparatus according to claim 1, wherein the circuitry is configured to perform the blurring processing by adding a blur to subjects other than those in a foreground of the first image data by a filter.

13. The image processing apparatus according to claim 1, wherein the circuitry is configured to perform the blurring processing by adding a blur to the first image data or the second image data by a low-pass filter, wherein a cut-off frequency of the low-pass filter changes with the distance information.

14. The image processing apparatus according to claim 1, wherein the circuitry is configured to perform the blurring processing to add a blur to the first image data by selectively using a two-dimensional Gaussian filter and a one-dimensional Gaussian filter.

15. The image processing apparatus according to claim 1, wherein the circuitry is configured to perform the blurring processing to add a blur to the first image data selectively using a first filter when an image height is less than a predetermined height and a second filter when the image height is greater than the predetermined height.

16. The image processing apparatus according to claim 15, wherein the first filter is a two-dimensional Gaussian filter and the second filter is a one-dimensional Gaussian filter.

17. An image processing apparatus comprising:
circuitry configured to:
   receive input of first image data obtained by shooting a subject in a first optical-system state of an imaging device, and second image data obtained by shooting the subject in a second optical-system state of the imaging device with a blur state different from a blur state of the first image data;
   calculate distance information corresponding to a position in a depth direction of a subject based on the first image data and the second image data, wherein the distance information is calculated based on a number of times a blurring processing is performed on the first image data; and
   perform the blurring processing to add a blur to the first image data selectively using a first filter when an image height is less than a predetermined height and a second filter when the image height is greater than the predetermined height.

* * * * *